(12) United States Patent
Favaretto

(10) Patent No.: US 12,012,888 B2
(45) Date of Patent: Jun. 18, 2024

(54) TURBINE ASSEMBLY FOR AN INTERNAL COMBUSTION ENGINE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/454,887

(22) Filed: Aug. 24, 2023

(65) Prior Publication Data

US 2024/0068395 A1  Feb. 29, 2024

(30) Foreign Application Priority Data

Aug. 25, 2022  (IT) .......................... 102022000017562

(51) Int. Cl.
| | | |
|---|---|---|
| *F02B 37/04* | (2006.01) | |
| *F02B 33/40* | (2006.01) | |
| *F02B 37/00* | (2006.01) | |
| *F02B 41/10* | (2006.01) | |

(52) U.S. Cl.
CPC .............. *F02B 37/04* (2013.01); *F02B 33/40* (2013.01); *F02B 37/001* (2013.01); *F02B 41/10* (2013.01); *F05D 2220/76* (2013.01)

(58) Field of Classification Search
CPC ........ F02B 37/04; F02B 33/40; F02B 37/001; F02B 41/10; F05D 2220/76
See application file for complete search history.

(56) References Cited

U.S. PATENT DOCUMENTS

2022/0003152 A1*  1/2022  Bevilacqua ............... F01D 1/04

FOREIGN PATENT DOCUMENTS

| DE | 102016207344 A1 | 11/2017 |
|---|---|---|
| DE | 102020117321 A1 | 1/2022 |
| EP | 1933017 A2 | 6/2008 |

OTHER PUBLICATIONS

Italian Search Report for Application No. 102022000017562, Filing Date: Aug. 25, 2022; dated Apr. 11, 2023, 6 pages.

* cited by examiner

*Primary Examiner* — Brandon D Lee
(74) *Attorney, Agent, or Firm* — CANTOR COLBURN LLP

(57) ABSTRACT

A turbine assembly for an internal combustion engine having: a first turbine that rotates around a first rotation axis and is configured to rotate due to the thrust exerted by exhaust gases emitted by the internal combustion engine; a second turbine which is independent of and separate from the first turbine, rotates around a second rotation axis parallel to and spaced from the first rotation axis, and is configured to rotate due to the thrust exerted by exhaust gases emitted by the internal combustion engine; an electric generator operated by the first turbine; and a transmission device that connects both the turbines to the same electric generator.

12 Claims, 28 Drawing Sheets

TURBINE ASSEMBLY FOR AN INTERNAL COMBUSTION ENGINE

CROSS-REFERENCE TO RELATED APPLICATIONS

This patent application claims priority from Italian patent application no. 102022000017562 filed on Aug. 25, 2022, the entire disclosure of which is incorporated herein by reference.

TECHNICAL FIELD

The present invention concerns a turbine assembly for an internal combustion engine.

PRIOR ART

For many years, supercharging (namely the forced introduction of air into the cylinders at a pressure higher than the atmospheric pressure) has been used in internal combustion engines to increase the volumetric efficiency of the cylinders and therefore guarantee the internal combustion engine greater power and torque with the same engine capacity. In other words, a compressor is arranged along the intake duct which compresses the intake air to increase the pressure (and therefore the flow rate) of the intake air and is operated by a turbine driven in rotation by the exhaust gases (in the case of a turbocompressor). To obtain particularly high flow rates (typically in the case of high-performance engines for sports cars) it is necessary to use a large-size compressor and turbine which, due to their dimensions, create considerable problems with positioning in the engine compartment.

The patent application DE102020117321A1 describes a turbocompressor for an internal combustion engine of a road vehicle; the turbocompressor comprises: a compressor that compresses the intake air to the internal combustion engine, an electric motor configured to operate the compressor, an electric generator configured to power the electric motor, and two axial turbines configured to operate the electric generator rotating under the thrust of the exhaust gases emitted by the internal combustion engine.

DESCRIPTION OF THE INVENTION

The object of the present invention is to provide a turbine assembly for an internal combustion engine which, while allowing the recovery of a high quantity of energy from the exhaust gases, has dimensions that simplify the installation thereof in the engine compartment.

According to the present invention, a turbine assembly is provided for a supercharged internal combustion engine, in accordance with the attached claims.

The claims describe preferred embodiments of the present invention forming an integral part of the present description.

BRIEF DESCRIPTION OF THE DRAWINGS

The present invention will now be described with reference to the attached drawings, which illustrate some non-limiting embodiment examples thereof, in which.

PREFERRED EMBODIMENTS OF THE INVENTION

Figure 1:
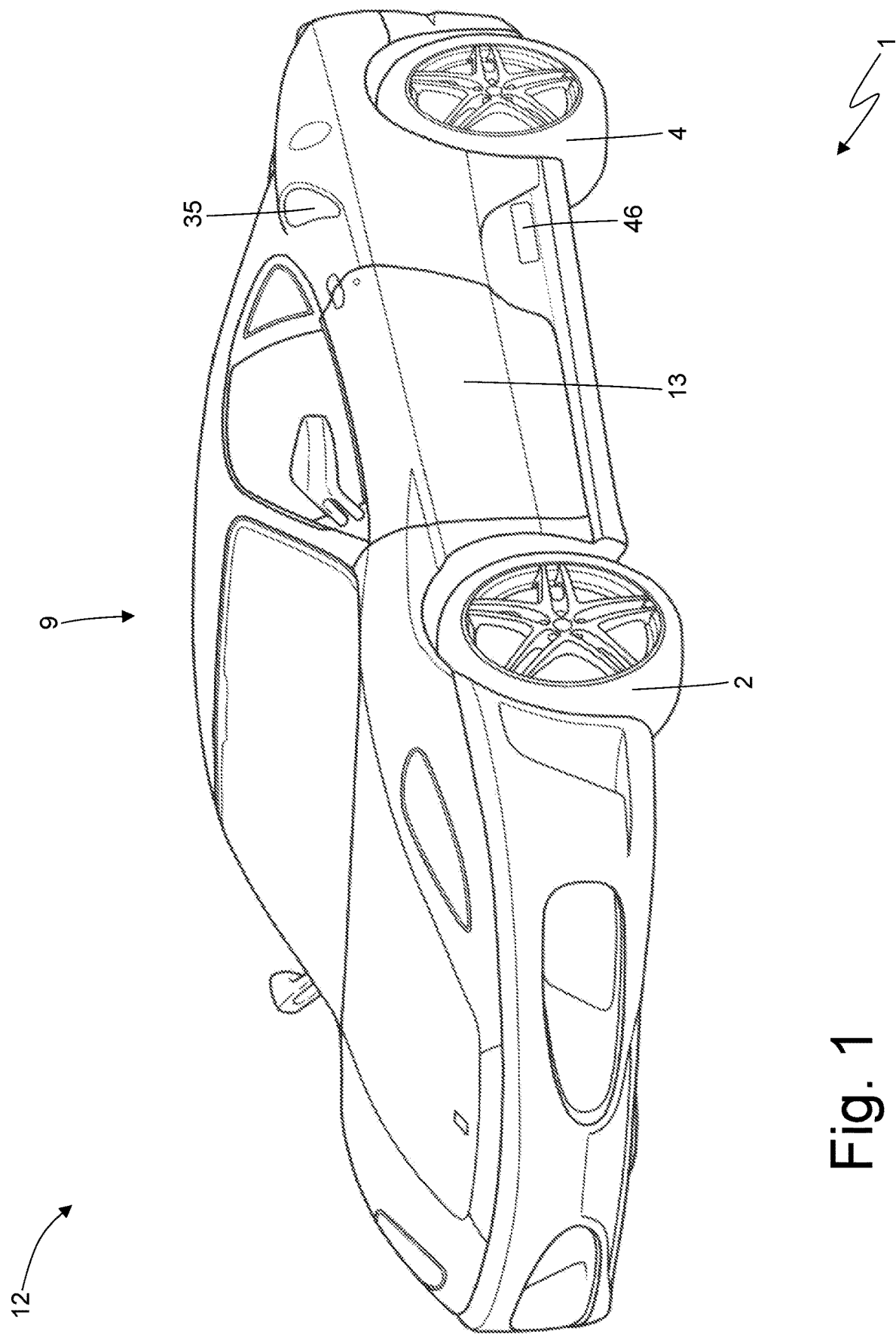
FIG. 1 is a perspective view of a car provided with an internal combustion engine.
Figure 4:
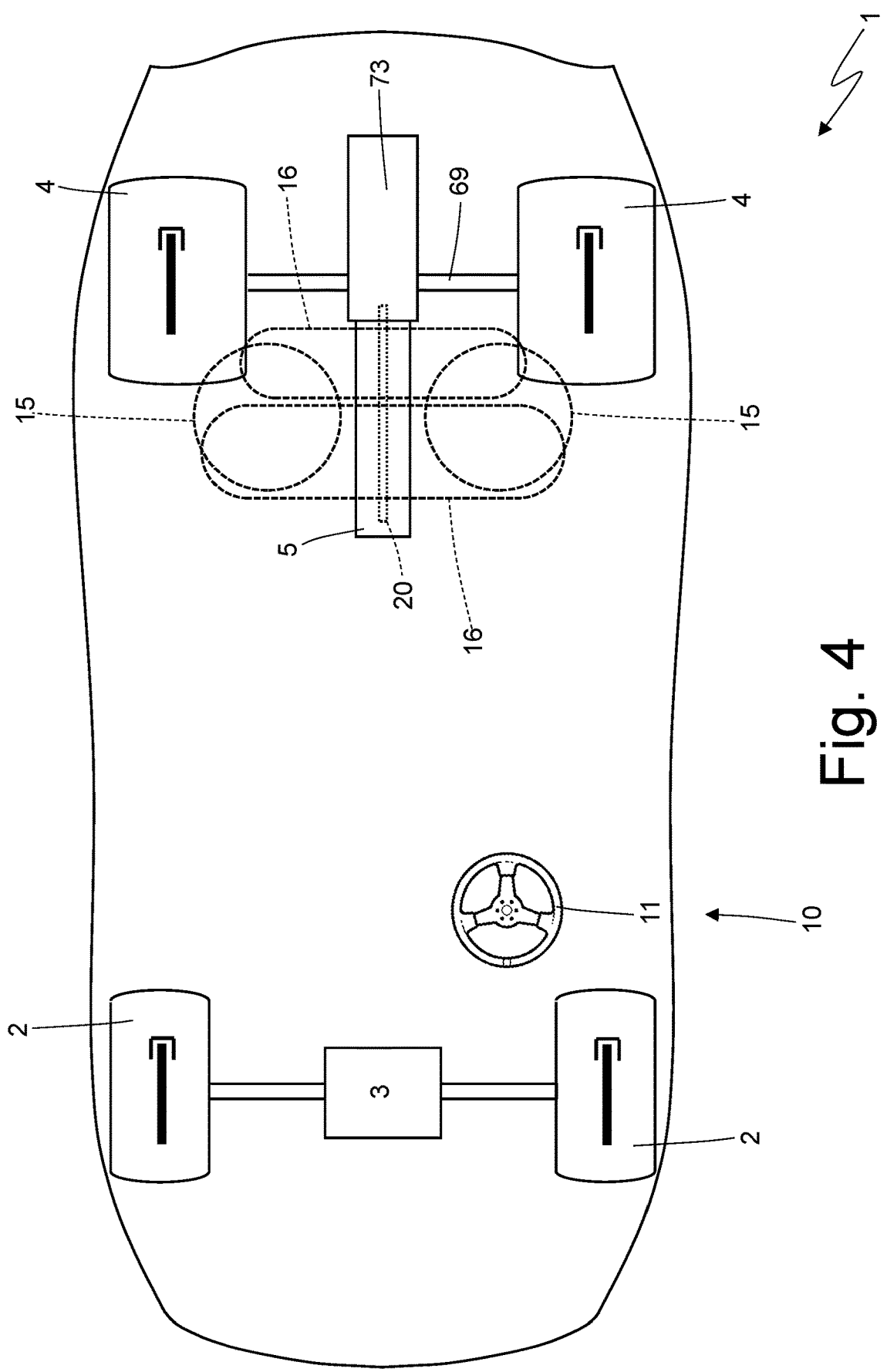
FIG. 4 is a schematic plan view of the car of FIG. 1.

In FIG. 1, the number 1 indicates overall a hybrid car (namely with hybrid propulsion) provided with two front drive wheels 2 that receive the torque from (at least) one electric machine 3 (illustrated schematically in FIG. 4) and two rear drive wheels 4 that receive the torque from an internal combustion engine 5 (illustrated schematically in FIG. 4).

Figure 15:
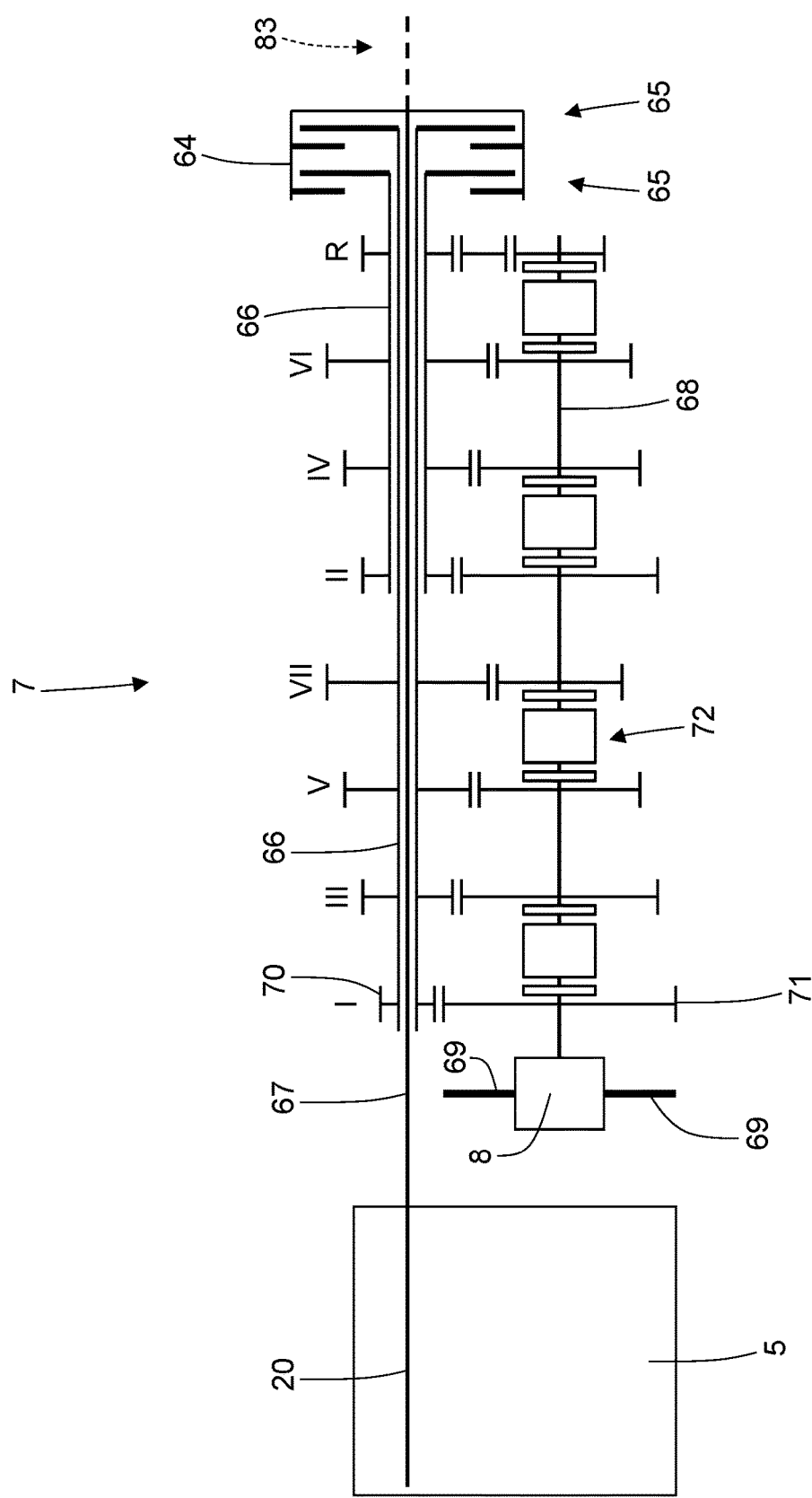
FIG. 15 is a schematic view of the transmission system of FIGS. 13 and 14.

According to FIG. 4, the electric machine 3 is connected to the two front drive wheels 2 by means of a transmission system (of known type and not illustrated) provided with a front differential; analogously, also the internal combustion engine is connected to the two rear drive wheels 4 by means of a transmission system 6 provided with a gearbox 7 and a rear differential 8 (illustrated schematically in FIG. 15).

Preferably, the electric machine 3 is reversible (namely, it can function both as an electric motor absorbing electric energy and generating a mechanical torque, and as an electric generator absorbing mechanical energy and generating electric energy); according to other embodiments not illustrated, the electric machine 3 is not provided.

Figure 2:
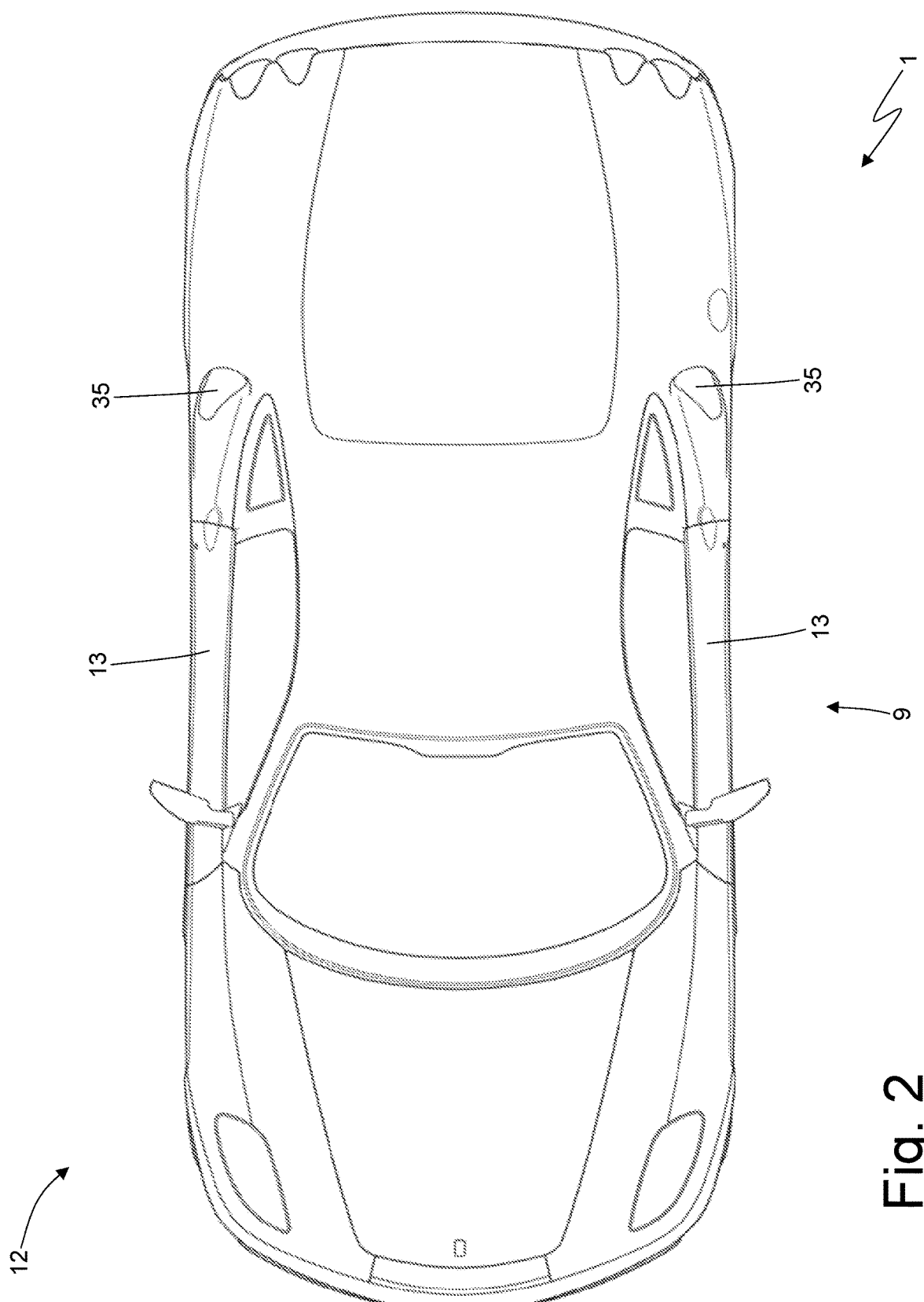
FIGS. 2 and 3 are a view from above and a view from below respectively of the car of FIG. 1.

According to FIGS. 1 and 2, the car 1 comprises a passenger compartment 9 which is arranged between the two front wheels 2 and the two rear wheels 4 and contains inside it a driving position 10 (schematically illustrated in FIG. 4) which is arranged on the left-hand side (alternatively it could also be arranged on the right-hand side). According to the illustration of FIG. 4, the driving position 10 comprises a steering wheel 11, a driving seat (not illustrated) and a series of other controls (known and not illustrated) that can be operated by the driver (including, for example, an accelerator pedal, a brake pedal and at least one gear lever).

According to FIGS. 1 and 2, the car 1 comprises a bodywork 12 that delimits (among other things) the passenger compartment 9 and has two sides in which at least two doors 13 are obtained. The left-hand door 13 gives direct access to the driving position 10.

Figure 3:
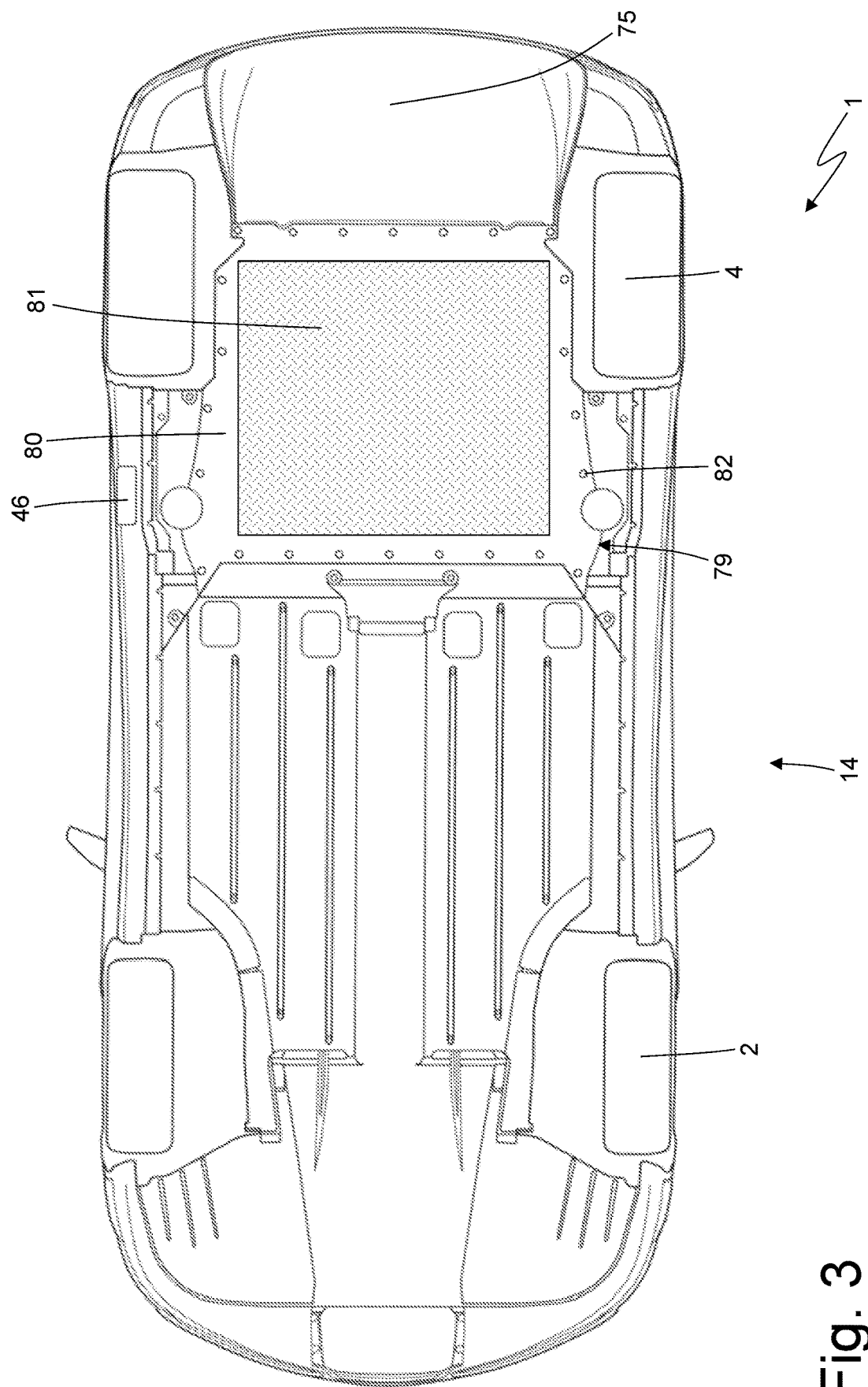

According to FIG. 3, the car 1 comprises a bottom 14 that forms the lowest part of the car 1 and in use faces a road surface on which the car 1 moves.

According to a possible embodiment, the internal combustion engine 5 is powered by hydrogen (or also another gaseous fuel). According to a different embodiment, the internal combustion engine 5 is powered by petrol (or also another liquid fuel).

According to FIG. 4, the internal combustion engine 5 is powered by hydrogen which is stored at high pressure (for example at a maximum pressure of approximately 700 bar) in four different tanks 15 and 16: the two tanks 15 have a spherical shape and the same dimension, while the two tanks 16 have a cylindrical shape and different dimensions (namely the tank 16 is bigger than the other tank 16).

The two tanks 15 (spherical shaped) are arranged beside an engine block of the internal combustion engine 5 on the two opposite sides of the internal combustion engine 5; namely, a tank 15 is arranged on the right of the engine block of the internal combustion engine 5 while the other tank 15 is arranged on the left of the engine block of the internal combustion engine 5. In other words, the two tanks 15 (spherical shaped) are arranged at the same vertical height and at the same longitudinal height and are separated from each other transversely (by the interposition of the engine block of the internal combustion engine 5), namely they are spaced from each other only transversely.

The two tanks 16 (cylindrical shaped) are arranged above the internal combustion engine 5 one in front of the other. In other words, the two tanks 16 (cylindrical shaped) are arranged (approximately) at the same vertical height, at the same transverse height and are separated from each other longitudinally, namely they are spaced from each other only longitudinally (that is, one is arranged in front of the other). In particular, both tanks 16 (cylindrical shaped) are oriented transversely, namely their central axes of symmetry are oriented transversely. In the embodiment illustrated in FIG. 4, the tank 16 arranged in front (that is, nearer the front) is bigger than the tank 16 arranged behind (that is, nearer the rear).

Figure 5:
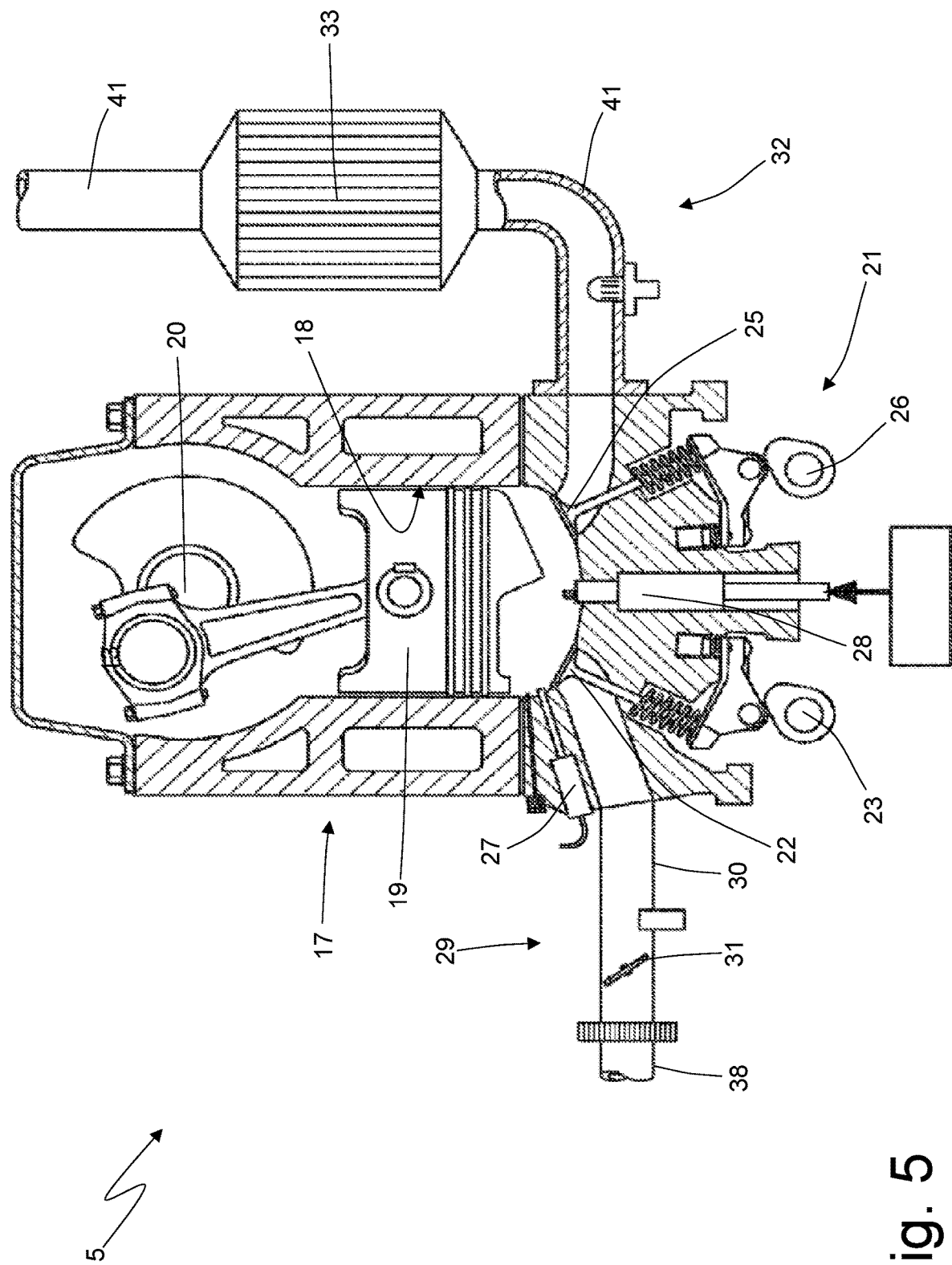
FIG. 5 is a schematic view of the internal combustion engine of the car of FIG. 1.

According to FIG. 5, the internal combustion engine 5 comprises a crankcase 17 inside which a plurality of cylinders 18 are obtained (only one of which is illustrated in FIG. 5). Preferably (but not obligatorily), the cylinders 18 are arranged in line since this solution allows the overall width of the internal combustion engine 5 to be reduced and therefore, among other things, leaves more space for the tanks 15. In the embodiment illustrated in the attached figures, six cylinders 18 are provided in line, but obviously the number and the arrangement of the cylinders 18 could be different.

Each cylinder 18 has a respective combustion chamber and a respective piston 19 mechanically connected to a drive shaft 20 (by means of a respective connecting rod) to transmit to the drive shaft 20 the force generated by the combustion. A head 21 (or cylinder head) is coupled (connected) to the crankcase 17; said head forms the roof of the cylinders 18 (namely the upper closure of the cylinders 18 with the so-called "flame plate"). In the case of an in-line arrangement of the cylinders 18, one single head 21 is provided whereas in the case of a "V" arrangement of the cylinders 18, two twin heads 21 are provided for the two banks of cylinders 18.

The crankcase 17 and head 21 assembly forms the engine block of the internal combustion engine 5.

In the embodiment illustrated in the attached figures, the internal combustion engine 5 is arranged (oriented) longitudinally, namely the drive shaft 20 is arranged (oriented) longitudinally since this solution allows the overall width of the internal combustion engine 5 to be reduced and therefore, among other things, leaves more space for the tanks 15. According to other embodiments not illustrated, the internal combustion engine 5 is arranged (oriented) transversely.

In the embodiment illustrated in the attached figures, the internal combustion engine 5 is arranged in a central or rear position, namely the internal combustion engine 5 is arranged behind the passenger compartment 9 and is between the front wheels 2 and the rear wheels 4 (central arrangement as illustrated in the attached figures) or is beyond the rear wheels 4 (rear arrangement not illustrated).

Each cylinder 18 comprises two intake valves 22 controlled by a camshaft 23 that receives the motion from the drive shaft 20 by means of a belt drive 24 (illustrated in FIG. 26); alternatively to the belt drive 24, a chain drive or a gear drive could be used. Furthermore, each cylinder 18 comprises two exhaust valves 25 controlled by a camshaft 26 that receives the motion from the drive shaft 20 via the belt drive 24 (illustrated in FIG. 26). The intake valves 22, the exhaust valves 25 and the corresponding control means (namely the return springs and the camshafts 23 and 26) are housed in the head 21.

Each cylinder 18 further comprises (at least) one fuel injector 27 that cyclically injects the fuel into the cylinder 18; FIG. illustrates direct injection of the fuel into the cylinder 18 but injection of the fuel into the cylinder 18 could also be (partially or completely) indirect. Each cylinder 18 comprises (at least) a spark plug 28 which is cyclically activated to trigger ignition of the mixture of air (comburent) and fuel present in the combustion chamber at the end of the compression phase.

As illustrated in the attached figures, the internal combustion engine 5 is oriented vertically with the drive shaft 20 arranged higher than the cylinders 18. In other words, the internal combustion engine 5 is arranged inverted with respect to the traditional arrangement in which the cylinders 18 are at the top and the drive shaft 20 is below. Consequently, the head 21 that forms the roof of the cylinders 18 is arranged below the crankcase 17 and represents the lowest part of the internal combustion engine 5.

The internal combustion engine 5 comprises an intake system 29 that takes air from the outside and conveys it into the cylinders 18 (air inlet into the cylinders 18 is regulated by the intake valves 22). Among other things, the intake system 29 comprises an intake manifold 30 which is directly connected to all the cylinders 18; air inlet into the intake manifold 30 is regulated by a throttle valve 31.

The internal combustion engine 5 comprises an exhaust system 32 that discharges the exhaust gases coming from the cylinders 18 to the outside. Among other things, the exhaust system 32 comprises (at least) an exhaust gas treatment device 33 (typically a catalytic converter).

As illustrated in FIGS. 9-12, the intake system 29 comprises two separate twin intake ducts 34 that are arranged on the two sides of the car 1 (namely one intake duct 34 is arranged on the right-hand side and the other intake duct 34 is arranged on the left-hand side) and originates from respective air intakes obtained through the bodywork 12.

Along each intake duct 34 and near the respective air intake 35, an air filter 36 is arranged. Each intake duct 34 terminates in a compressor unit 37 that increases the air pressure to increase the volumetric efficiency of the cylinders 18. One (single) intake duct 38 originates from the compressor unit 37, said duct terminating in the intake manifold 30 after passing through two intercoolers 39 and 40 arranged in series. Namely, an initial section of the intake duct 38 connects the compressor unit 37 to the intercooler 39, therefore an intermediate section of the intake duct 38 connects the intercooler 39 to the intercooler 40, and lastly a final section of the intake duct 38 connects the intercooler 40 to the intake manifold 30.

According to a preferred embodiment, the intercooler 39 is of the air/air type and also the intercooler 40 is of the air/air type. According to a preferred embodiment, the intercooler 39 has a greater volume than a volume of the intercooler 40; in said regard it is important to note that the intercooler 39 is at a disadvantage with respect to the intercooler 40, since it is arranged farther from the corresponding air intake and compensates for this disadvantage both by a larger volume and by having to cool air with a higher inlet temperature (since the intercooler 39 receives the air directly from the compressor unit 37 while the intercooler 40, being arranged in series with the intercooler 39, receives the air already partially cooled by the intercooler 39).

As illustrated in FIGS. 9-12, the exhaust system 32 comprises two separate twin exhaust ducts 41 that receive the exhaust gases from respective cylinders 18 to which they are individually connected; in particular, each exhaust duct 41 is connected to three cylinders 18 by means of respective channels that originate from the three cylinders 18 and terminate in an inlet of the exhaust duct 41 (in other words, each exhaust duct 41 is initially divided into three parts for connection to the respective three cylinders 18). Along each exhaust duct 41, a corresponding exhaust gas treatment device 33 (typically a catalytic converter) is arranged; therefore overall the exhaust system 32 comprises two separate twin exhaust gas treatment devices 33.

Along the exhaust ducts 41 a turbine assembly 42 is arranged provided with two twin turbines 43 (better illustrated in FIG. 17), each of which is coupled to a corresponding exhaust duct 41. Namely, each exhaust duct 41 passes through a respective turbine 43 and the two turbines 43 are arranged side by side to form the turbine assembly 42. In other words, a turbine 43 is provided which is connected along each exhaust duct 41 and is arranged beside the engine block (consisting of the crankcase 17 and the head 21) of the internal combustion engine 5.

The two exhaust ducts 41 terminate in one single common silencer 44 that receives the exhaust gases from both the exhaust ducts 41. According to other embodiments not illustrated, two separate twin silencers 44 are provided, each of which receives the exhaust gases only from a respective exhaust duct 41.

In the preferred embodiment illustrated in the attached figures, the silencer 44 has one single end exhaust gas pipe 45 leading to an outlet 46; according to other embodiments not illustrated, the silencer 44 has two or more end pipes 45, each of which lead to a corresponding outlet 46.

Figure 16:
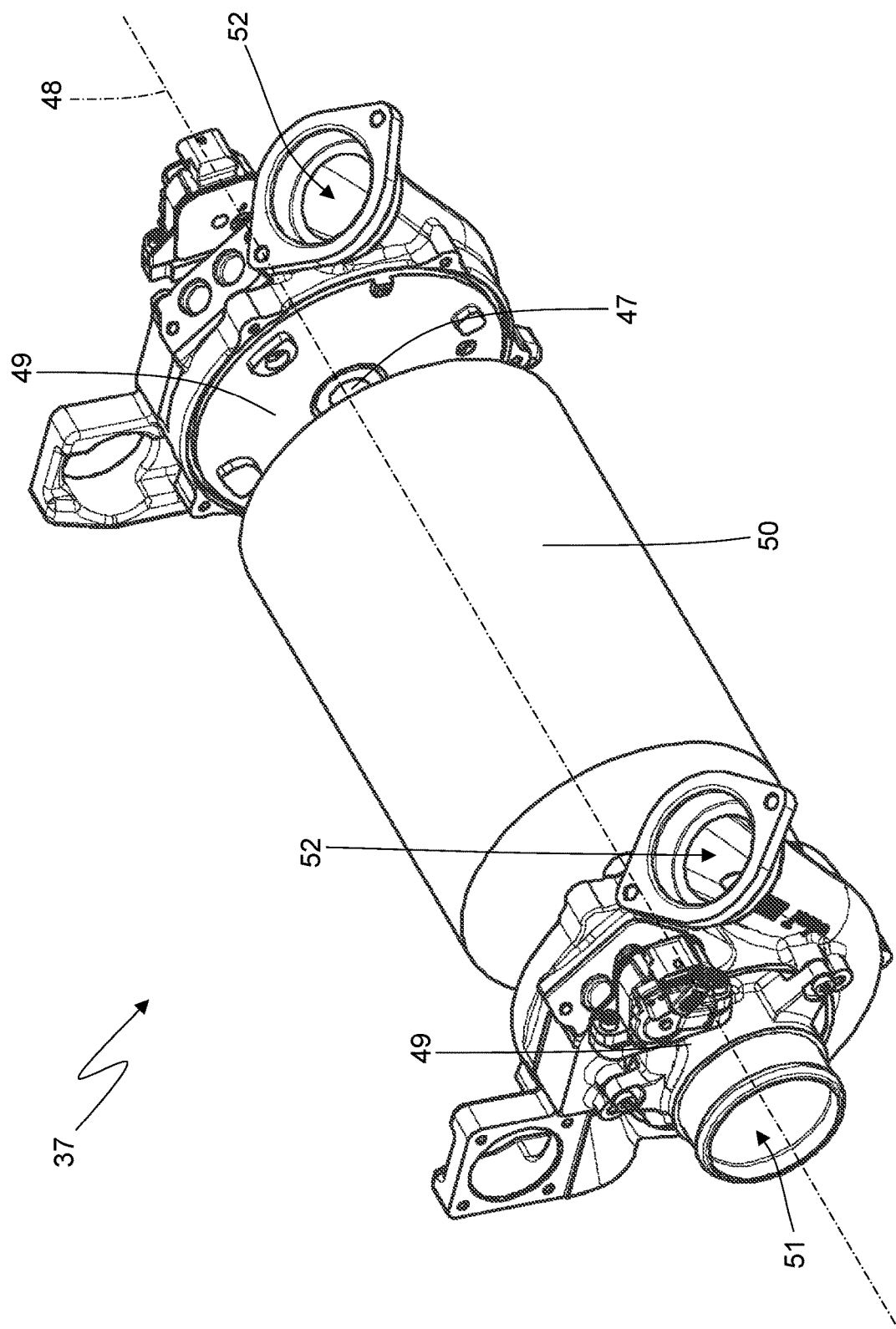
FIG. 16 is a perspective view of a compressor unit of the internal combustion engine of the car of FIG. 1.

As illustrated in FIG. 16, the compressor unit 37 (for use in the turbocharged internal combustion engine 5) comprises one single shaft 47 mounted revolvingly around a rotation axis 48. In the embodiment illustrated in the attached figures, the shaft 47 (therefore the rotation axis 48) is oriented transversely; according to a different embodiment not illustrated, the shaft 47 (therefore the rotation axis 48) is oriented longitudinally or is inclined (not parallel) with respect to both the longitudinal direction L and the transverse direction T.

The compressor unit 37 comprises two (identical) twin compressors 49, each of which is integral with the shaft 47 to rotate together with the shaft 47 and is configured to compress air drawn in by the turbocharged internal combustion engine 5; in particular, each compressor 49 receives the air from a respective intake duct 34 (namely each intake duct 34 terminates in a corresponding compressor 49).

The compressor unit 37 comprises a single common electric motor 50 which is integral with the shaft 47 to drive in rotation the shaft 47 (and therefore to drive in rotation both the compressors 49 mounted on the shaft 47). In the embodiment illustrated in the attached figures, the electric motor 50 is arranged between the two compressors 49 and is perfectly equidistant from the two compressors 49; according to a different embodiment not illustrated, the electric motor 50 is arranged on one side relative to both the compressors 49 (namely it is nearer a compressor 49 and farther from the other compressor 49).

As mentioned previously, the two compressors 49 are identical and are of centrifugal type. In particular, each compressor 49 comprises an axial inlet 51 arranged on the opposite side of the shaft 47 and connected to a respective intake duct 34 and a radial outlet 52. According to a preferred embodiment, the compressor unit 37 comprises a connection duct 53 (illustrated in FIGS. 9-12) which is connected to both the outlets 52 of the two compressors 49 to receive and combine the compressed air from both the compressors 49; the connection duct 53 terminates in the intake duct 38, namely the intake duct 38 begins from the connection duct 53, to receive and combine the compressed air from both the compressors 49.

In the embodiment illustrated in the attached figures, the connection duct 53 is oriented transversely; according to a different embodiment not illustrated, the connection duct 53 is oriented longitudinally or is inclined (not parallel) both relative to the longitudinal direction and relative to the transverse direction.

In the embodiment illustrated in the attached figures, the connection duct 53 is oriented parallel to the shaft 47 (and therefore to the rotation axis 48); according to a different embodiment not illustrated, the connection duct 53 is not oriented parallel to the shaft 47 (and therefore to the rotation axis 48).

Figure 17:
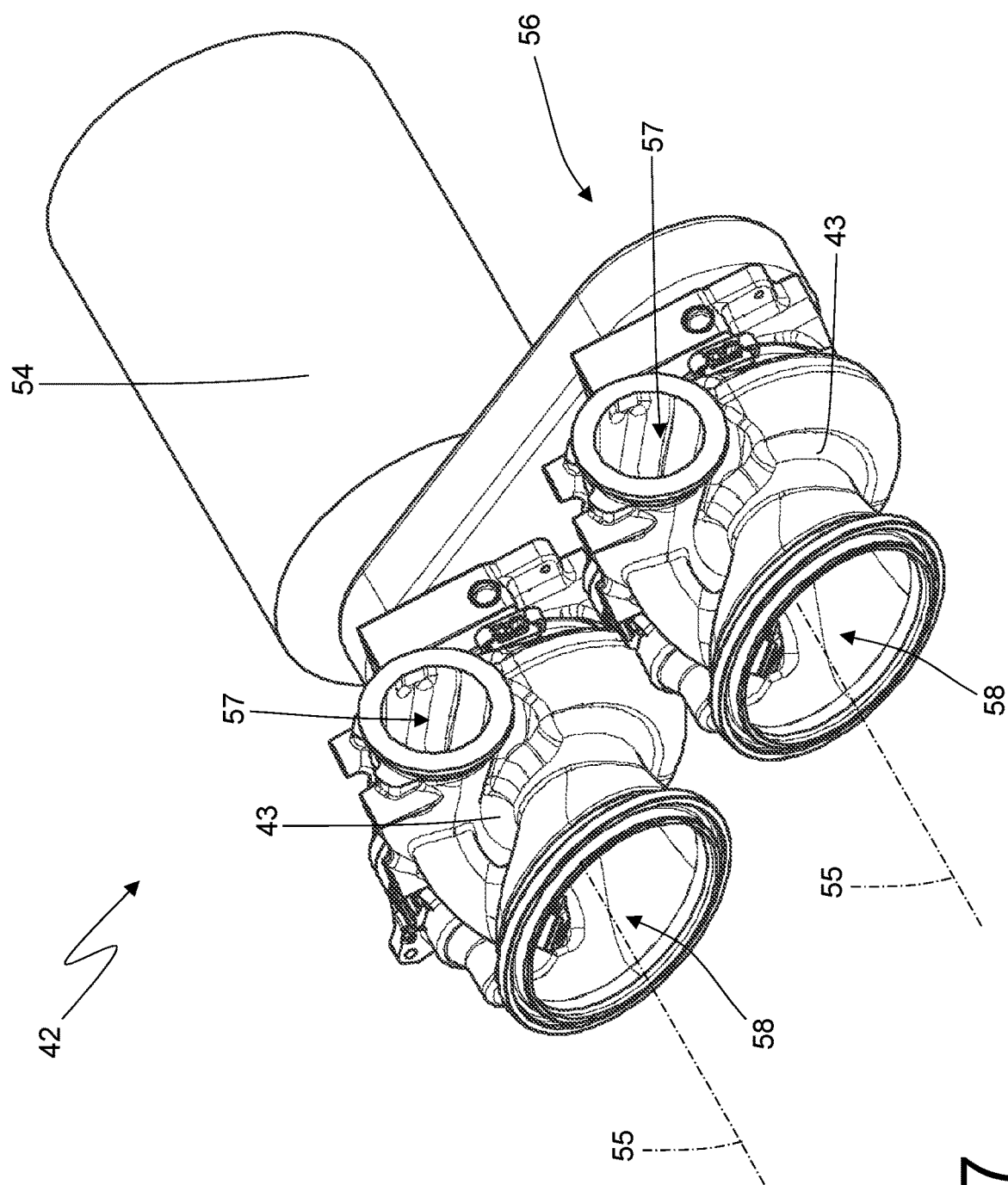
FIG. 17 is a perspective view of a turbine assembly of the internal combustion engine of the car of FIG. 1.
Figure 18:
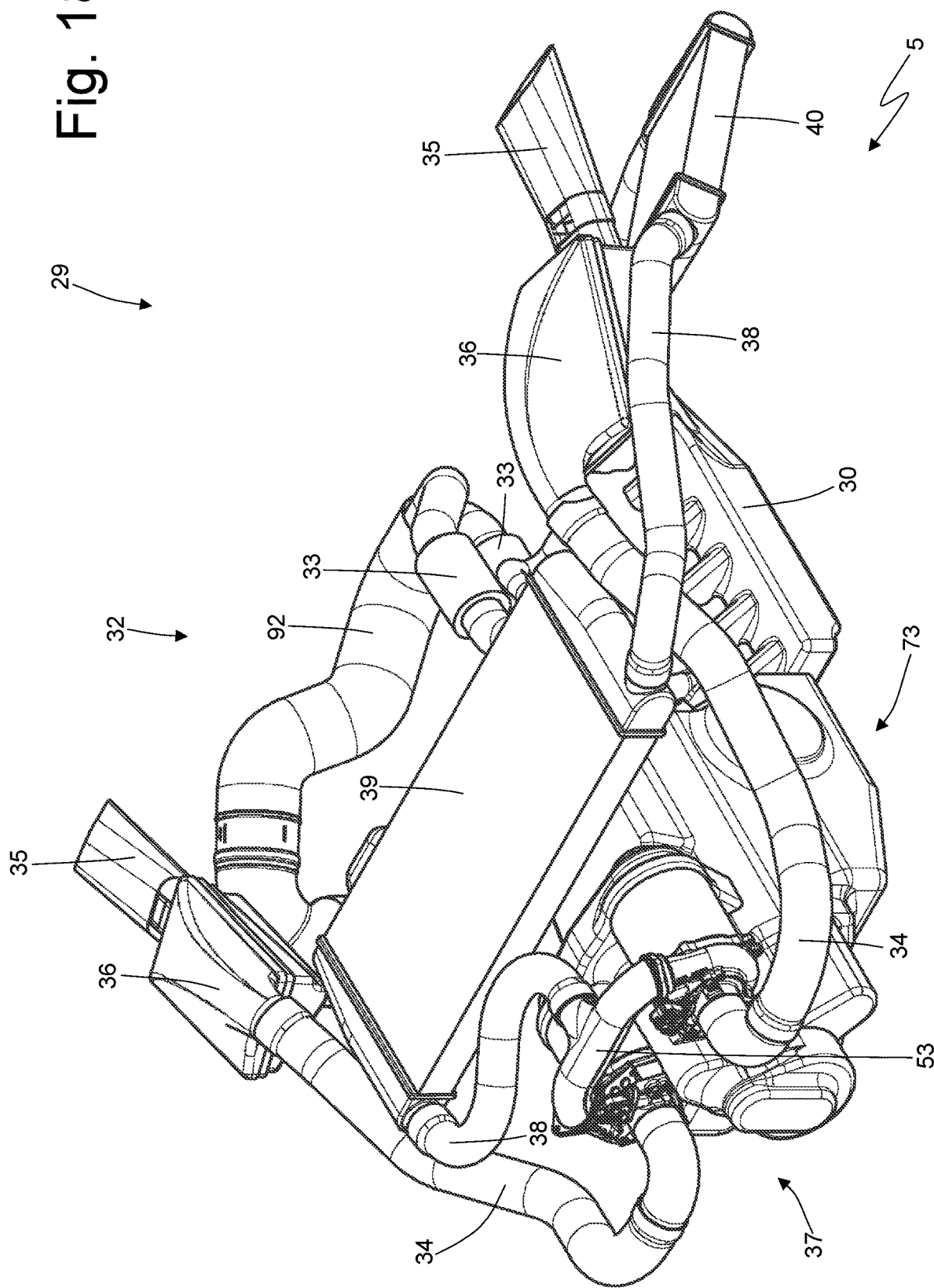
FIGS. 18-21 are two different perspective views respectively, one view from above and one view from below of an alternative embodiment of the internal combustion engine.
Figure 19:
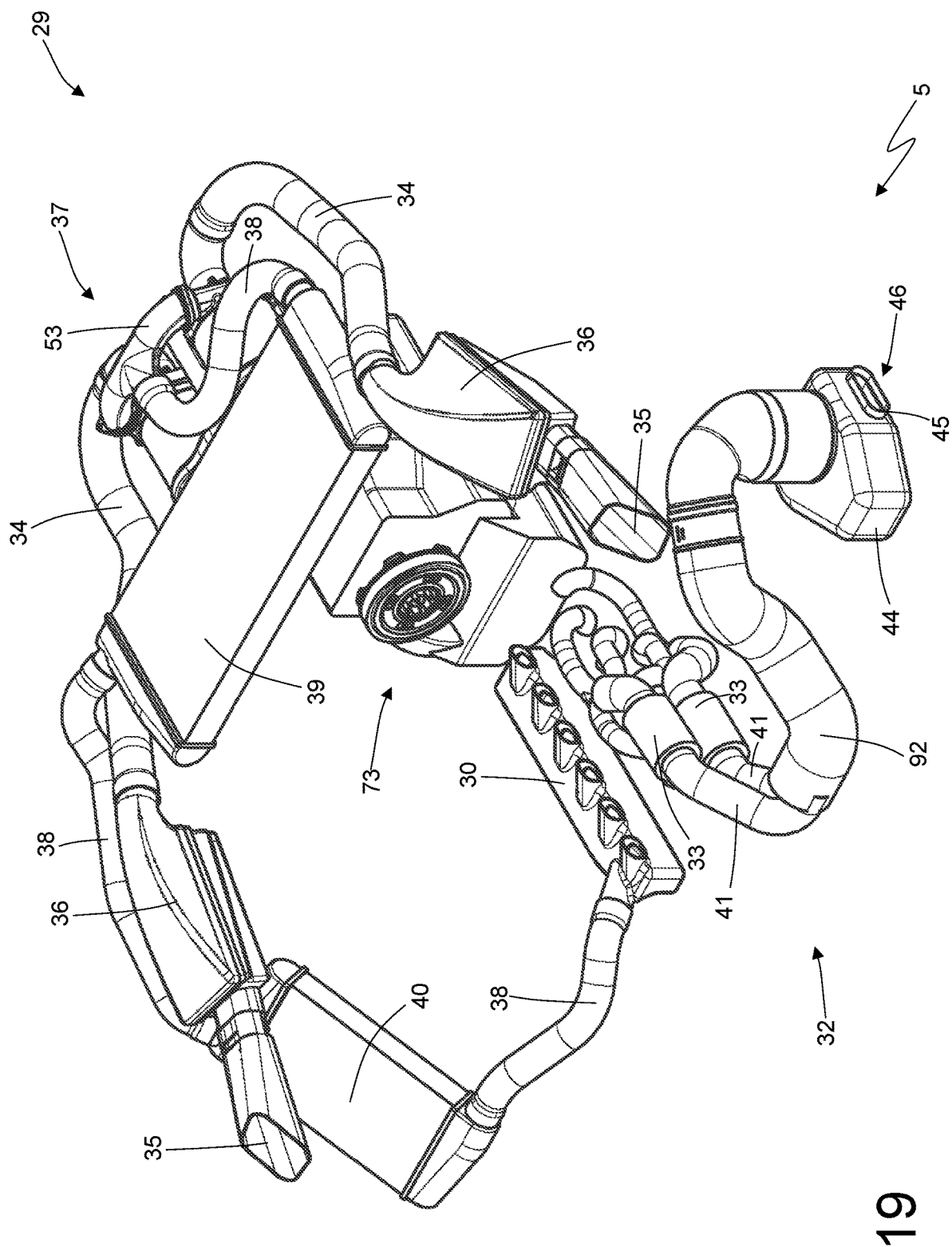
Figure 20:
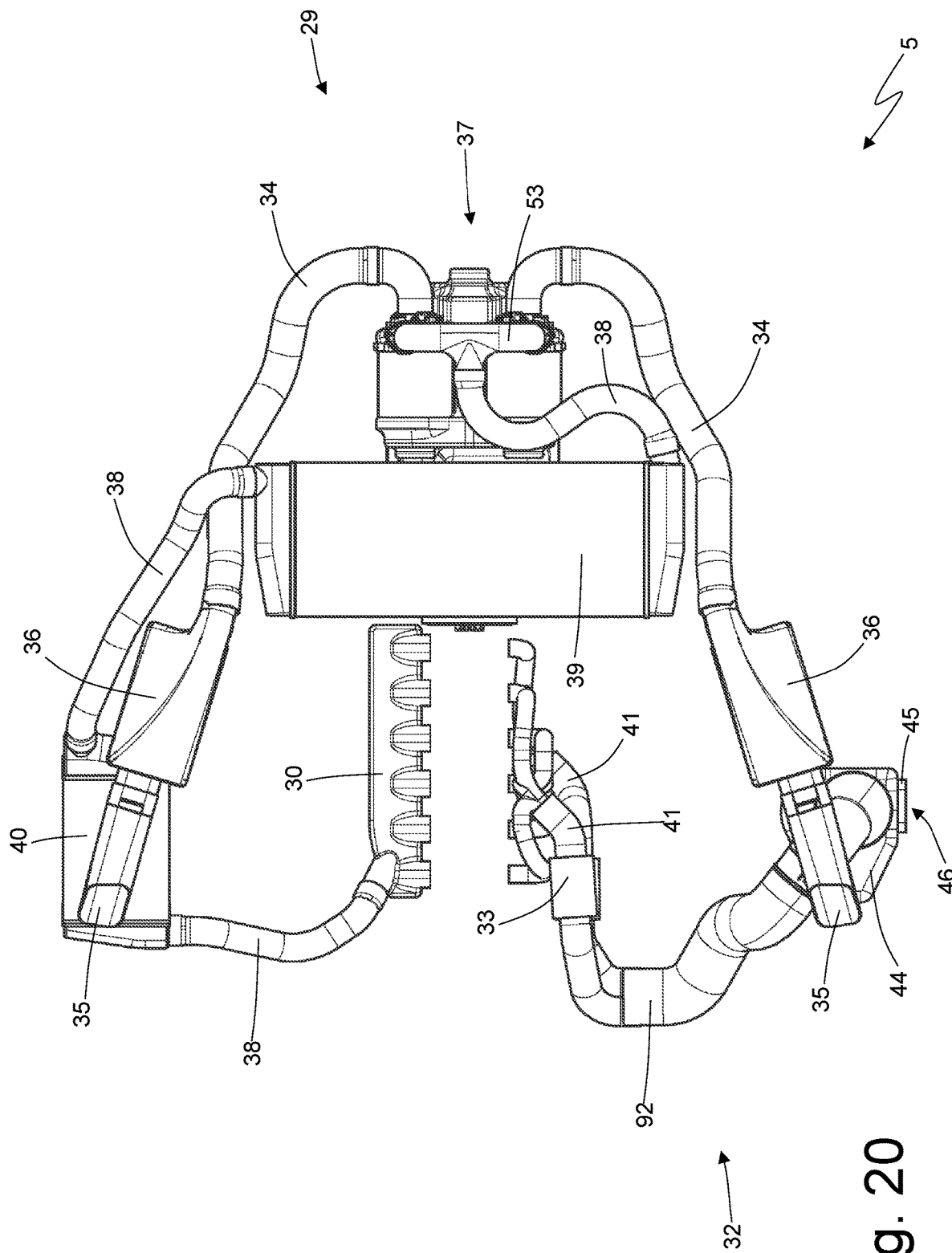
Figure 21:
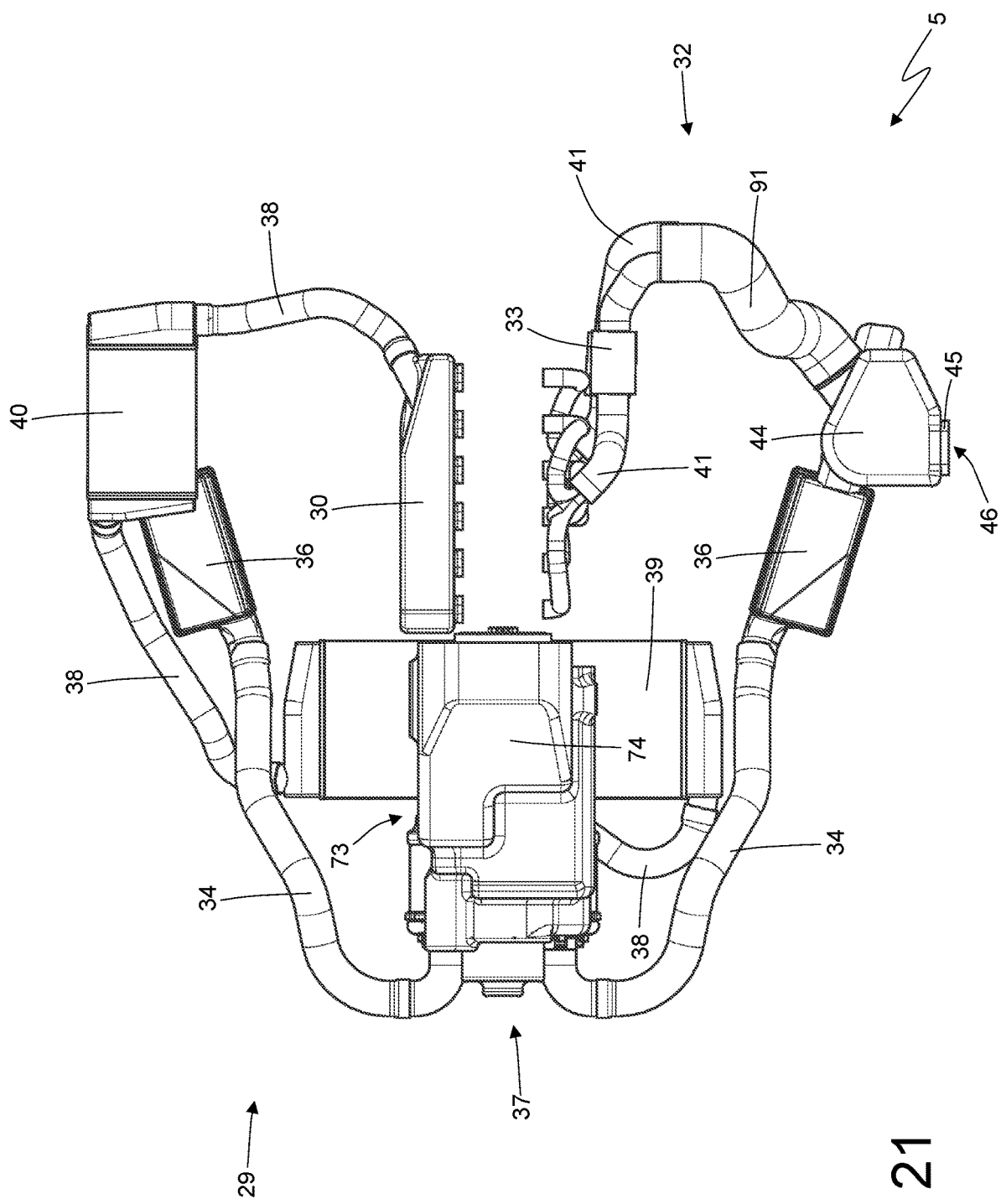

As illustrated in FIG. 17, the turbine assembly 42 comprises two (identical) twin turbines 43 that together operate the same electric generator 54. In particular, the two turbines 43 are arranged side by side and have two respective rotation axes 55 parallel to and spaced from each other. The turbine assembly 42 comprises a transmission device 56 that connects both the turbines 43 to the same electric generator 54 and is configured to give the two turbines 43 the same rotation speed (namely the two shafts of the two turbines are mechanically constrained to each other so as to always rotate at the same rotation speed). The transmission device 56 comprises two toothed gears, each of which is integral with the shaft of a corresponding turbine 43 to receive the rotary motion from the turbine 43, and a connection element (a timing belt, a chain, a gear cascade) that connects the two cog wheels to each other so as to cause both the toothed gears to rotate together at the same rotation speed. According to a possible embodiment, one toothed gear of the two toothed gears of the transmission device 56 is directly constrained to a shaft of the electric generator 54 so that the electric generator 54 rotates at the same rotation speed as the two turbines 43; alternatively, one toothed gear of the two toothed gears of the transmission device 56 is connected to the shaft of the electric generator 54 by the interposition of a speed reducer (typically of the gear type) so that the electric generator 54 rotates at a rotation speed lower than the rotation speed of the two turbines 43.

According to a preferred embodiment illustrated in the attached figures, the electric generator 54 is coaxial to a turbine 43; namely a turbine 43 and the electric generator 54 rotate around the same first rotation axis 55 while the other turbine 43 rotates around a second rotation axis 55 parallel to and spaced from the first rotation axis 55.

The two turbines 43 are identical and are of the centrifugal type. In particular, each turbine 43 comprises a radial inlet 57 connected to a side of the respective exhaust duct 41 and an axial outlet 52 arranged on the opposite side of the transmission device 56 and connected to another side (leading into the silencer 44) of the respective exhaust duct 41.

Figure 11:
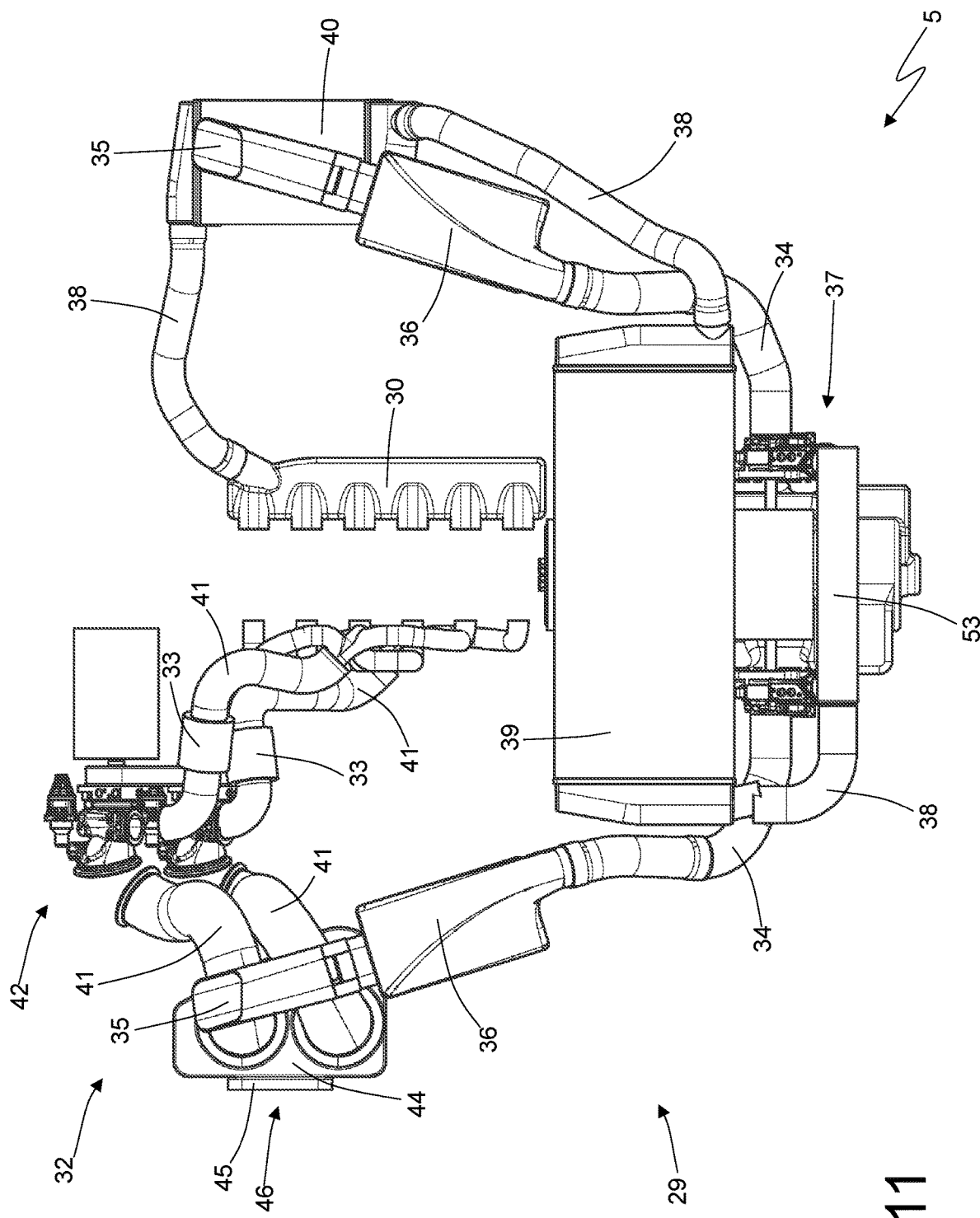
Figure 12:
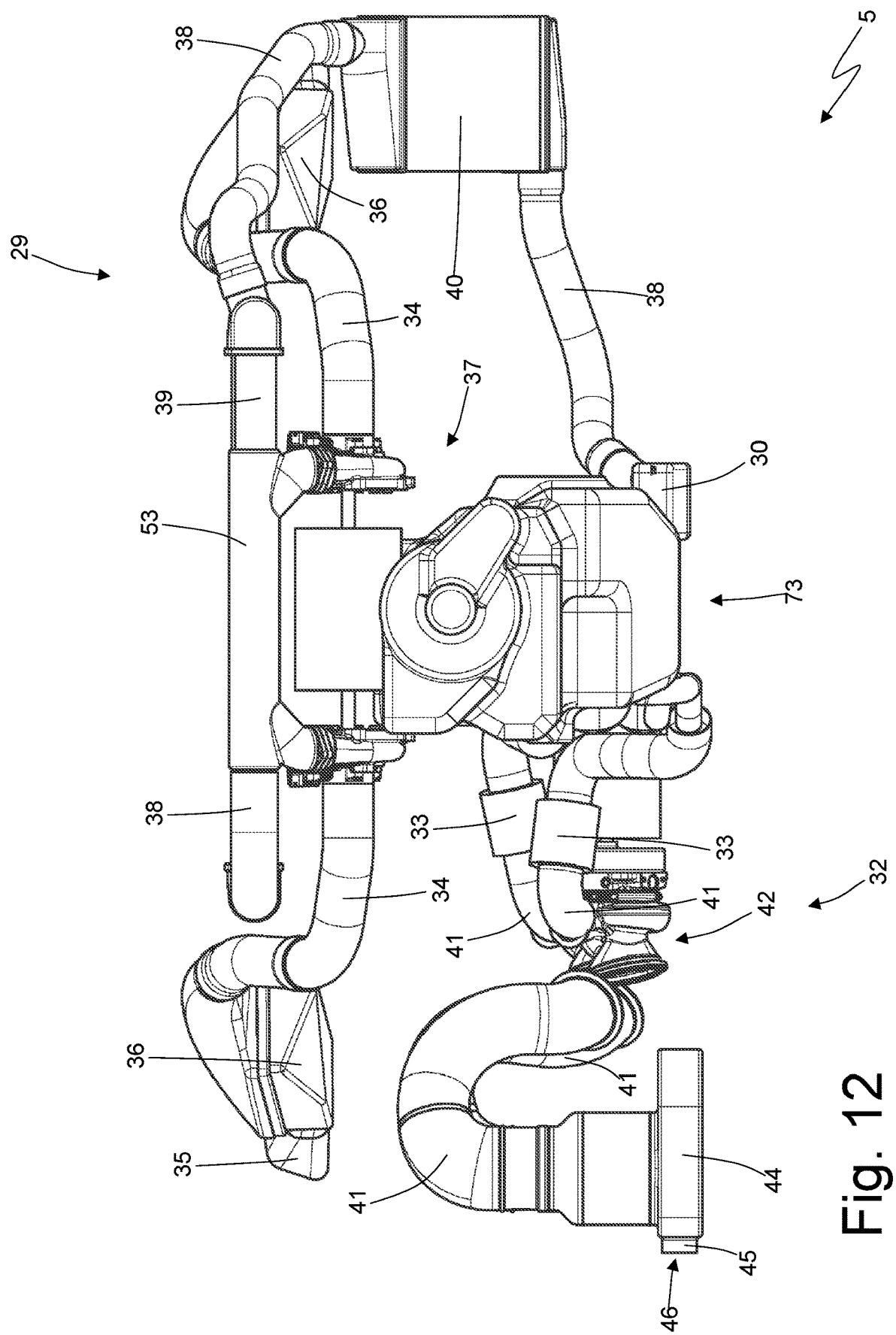

According to a preferred embodiment better illustrated in FIGS. 11 and 12, the silencer 41 is arranged beside an engine block (composed of the crankcase 17 and the head 21) of the internal combustion engine 5 (on the side of the exhaust valves 25). The outlet 46 of the silencer 41 is obtained through a side of the car 1 (as illustrated in FIG. 1) or, according to an alternative embodiment, through the bottom 14 of the car 1 (as illustrated in FIG. 3).

In other words, the outlet 46 of the silencer 44 is arranged asymmetrically in the area of one side of the car 1 and is between a rear wheel 4 and a door 13. According to a preferred embodiment, the outlet 46 of the silencer 44 is arranged on the side where the driving position 16 is located; in this way the driver sitting in the driving position 16 is near the outlet 46 of the silencer 44 and therefore in the best position to optimally hear the noise transmitted through the outlet 46 of the silencer 44.

In the embodiment illustrated in FIG. 1, the outlet 46 of the silencer 44 is obtained through a side of the bodywork 12, while in the alternative embodiment illustrated in FIG. 3, the outlet 46 of the silencer 44 is obtained through the bottom 14. In the embodiment illustrated in the attached figures, the silencer 44 comprises one single outlet 46; according to other embodiments not illustrated, the silencer 44 comprises several outlets 46 which can be more or less side by side (if necessary, it is also possible for an outlet 46 of the silencer 44 to be obtained through a side of the bodywork 12 while the other outlet 46 of the silencer 44 is obtained through the bottom 14).

According to a preferred embodiment better illustrated in FIGS. 11 and 12, the silencer 44 is arranged on a side of the car 1 beside an engine block (formed of the crankcase 17 and the head 21) of the internal combustion engine 5 and in front of a rear drive wheel 4.

According to a preferred embodiment better illustrated in FIGS. 11 and 12, the turbine assembly 42 is arranged beside an engine block (formed of the crankcase 17 and the head 21) of the internal combustion engine 5 (on the side of the exhaust valves 25). In particular, the turbine assembly 42 is arranged between the internal combustion engine 5 (namely between the engine block formed of the crankcase 17 and the head 21) and the silencer 44; in this way, the exhaust ducts 41 are particularly short and not too twisty.

In the embodiment illustrated in FIGS. 9-12, the compressor unit 37 (comprising the two twin compressors 49) is connected between the two intake ducts 34 and 38, is arranged behind the engine block (formed of the crankcase 17 and the head 21) of the internal combustion engine 5, is arranged higher than the engine block of the internal combustion engine 5, and is driven by the electric motor 50.

As illustrated better in FIGS. 9-12, the compressor unit 37 (comprising the two twin compressors 49) is arranged at the rear behind the intercooler 39 (namely the two compressors 49 of the compressor unit 37 are arranged at the rear behind the intercooler 39). The intercooler 39 is oriented horizontally and is arranged behind (at the rear of) the engine block (formed of the crankcase 17 and the head 21) of the internal combustion engine 5; in particular, the intercooler 39 is arranged higher than the engine block of the internal combustion engine 5 and is behind the engine block of the internal combustion engine 5. In other words, the intercooler 39 has a parallelepipedal shape with the two larger walls (the two major walls, namely the two longest walls) oriented horizontally, is arranged above the gearbox 7 and is therefore arranged longitudinally farther back than the engine block of the internal combustion engine 5, and is arranged higher than the engine block of the internal combustion engine 5.

The intercooler 40 (connected in series to the intercooler 39 along the intake duct 38), on the other hand, is arranged on one side of the car beside the engine block (formed of the crankcase 17 and the head 21) of the internal combustion engine and in front of a rear drive wheel 4. In particular, the intercooler 40 is arranged on one side of the car 1 opposite the silencer 44; namely, the intercooler 40 and the silencer 44 are arranged on the opposite sides of the car 1 separated from each other by the engine block (formed of the crankcase 17 and the head 21) of the internal combustion engine 5. In other words, the intercooler 40 and the silencer 44 are arranged on the opposite sides of the engine block of the internal combustion engine 5.

Figure 28:
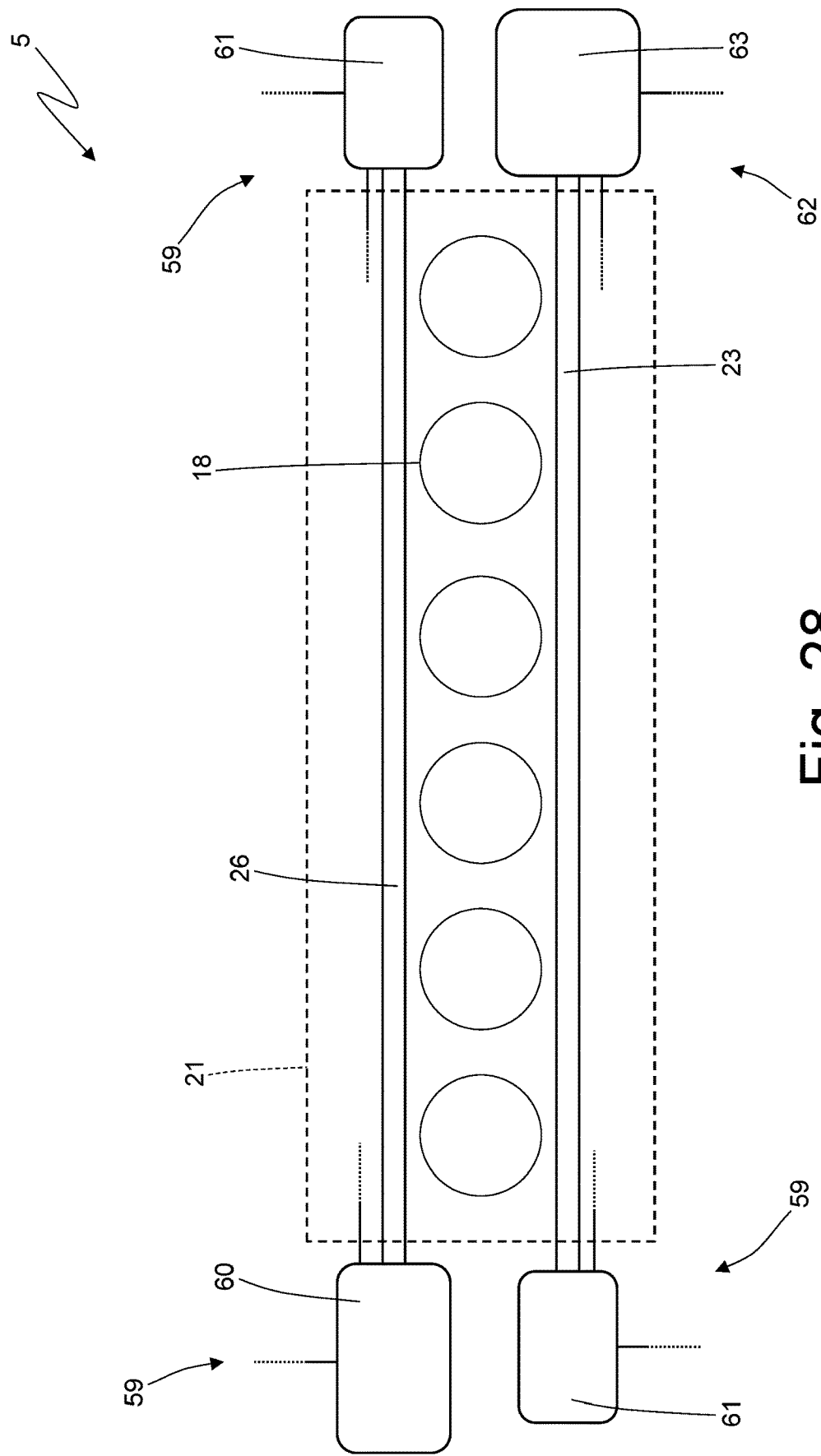

As illustrated in FIG. 28, the internal combustion engine 5 comprises a dry sump lubrication circuit 59 which circulates a lubricating oil through all the moving parts of the internal combustion engine 5. The lubrication circuit 59 comprises a delivery lubrication pump 60 configured to circulate the lubricating oil; namely, the delivery lubrication pump 60 takes the lubricating oil from an oil tank and pumps it into the engine block (formed of the crankcase 17 and the head 21). The lubrication circuit 59 comprises two recovery lubrication pumps 61 configured to circulate the lubricating oil; namely, each recovery pump 61 takes the oil from the engine block (formed of the crankcase 17 and the head 21) and in particular from the lower part of the engine block and therefore from the head 21, and pumps the lubricating oil into the tank (which is arranged higher than the head 21).

According to a preferred embodiment, the two recovery lubrication pumps 61 are arranged on opposite sides of the head 21, so as to draw the lubricating oil from opposite areas of the head 21.

As illustrated in FIG. 28, the internal combustion engine 5 comprises a cooling circuit 62 which circulates a cooling liquid (for example a mixture of water and glycol) in the engine block (formed of the crankcase 17 and the head 21) of the internal combustion engine 5. The cooling circuit 62 comprises a cooling pump 63 configured to circulate the cooling liquid.

Figure 27:
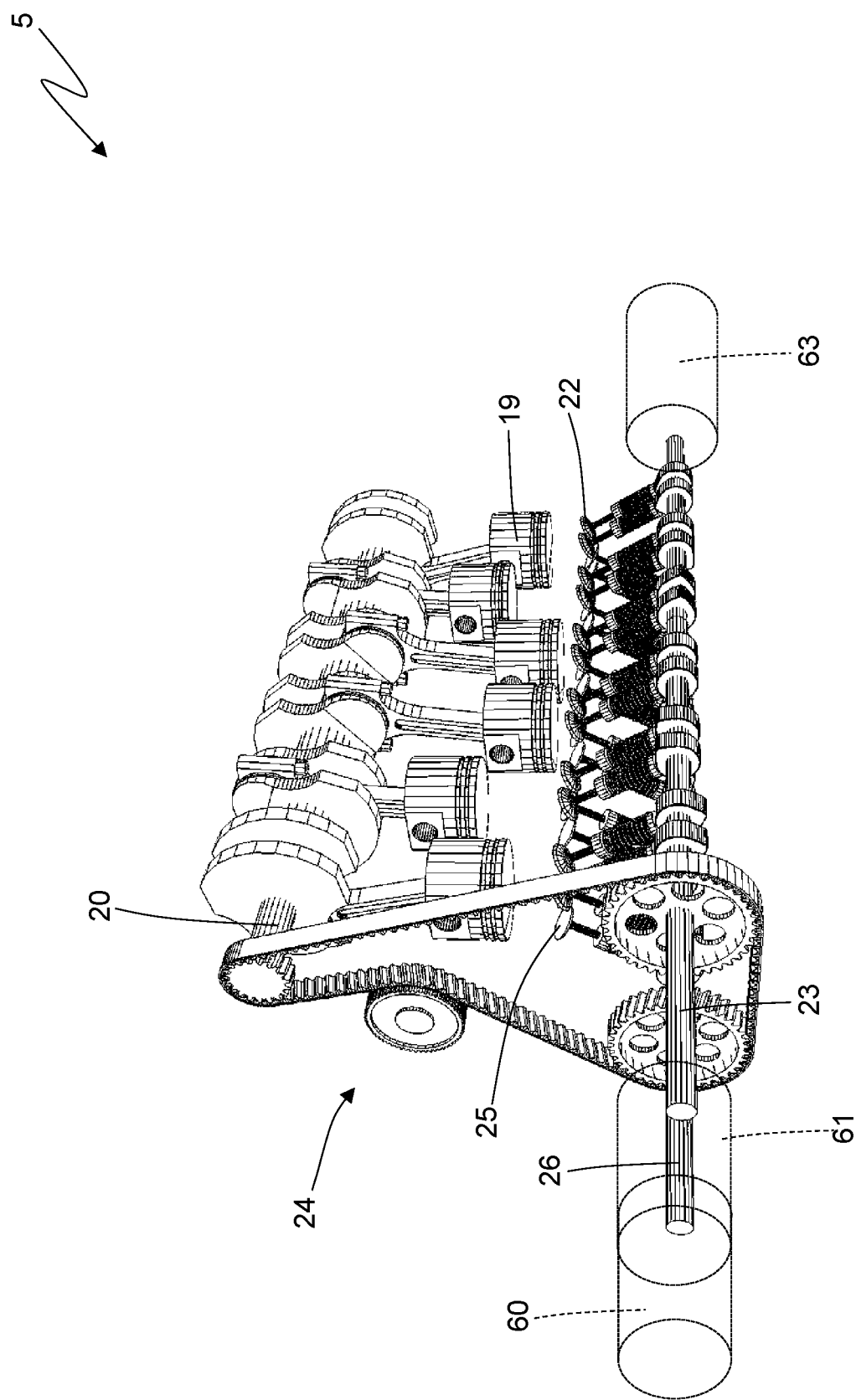
FIGS. 27 and 28 are a perspective view and a schematic view respectively of two camshafts of the internal combustion engine with the arrangement of lubrication pumps and a cooling pump highlighted.

As illustrated in FIGS. 27 and 28, the camshaft 23 protrudes axially from the head 21 on both sides: a lubrication pump 61 is arranged coaxial to the camshaft 23 and is directly connected to the camshaft 23 to be driven in rotation by said camshaft 23; analogously, the cooling pump 63 is arranged coaxial to the camshaft 23 on the opposite side of the lubrication pump 61 and is directly connected to the camshaft 23 to be driven in rotation by said camshaft 23.

As illustrated in FIGS. 27 and 28, the camshaft 26 protrudes axially from the head 21 on both sides: the other lubrication pump 61 (different from the lubrication pump 61 connected to the camshaft 23) is arranged coaxial to the camshaft 26 and is directly connected to the camshaft 26 to be driven in rotation by said camshaft 26; analogously, the lubrication pump 60 is arranged coaxial to the camshaft 26 on the opposite side of the lubrication pump 61 and is directly connected to the camshaft 26 to be driven in rotation by said camshaft 26.

In this way, all four pumps 60, 61 and 63 are coaxial to the respective camshafts 23 and 26 and are driven in rotation directly by the respective camshafts 23 and 26.

According to other embodiments not illustrated, the number of pumps 60, 61 and 63 is different (less) since, for example, only one delivery lubrication pump 61 may be provided; in this case (at least) one camshaft 23 or 26 protrudes axially from the head 21 only on one side.

According to other embodiments not illustrated, the arrangement of the pumps 60, 61 and 63 could be different or could vary: for example, the cooling pump 63 could be connected to the camshaft 26 or the lubrication pump 60 could be connected to the camshaft 23.

As illustrated in FIG. 15, the gearbox 7 is directly connected to the drive shaft 20 of the internal combustion engine 5, is aligned with the internal combustion engine 5, and is arranged behind the internal combustion engine 5. In particular, the gearbox 7 is vertically aligned with an upper part of the engine block of the internal combustion engine 5; namely, the gearbox 7 is vertically aligned with the upper part of the crankcase 17.

The gearbox 7 has a double clutch and is interposed between the drive shaft 20 of the internal combustion engine 5 and the rear drive wheels 4. The gearbox 7 comprises a cage 64 which is driven in rotation by the drive shaft 20, and two clutches 65 contained beside each other in the cage 64 to take the motion from the cage 64. Furthermore, the gearbox 7 comprises two primary shafts 66 which are coaxial to each other, are inserted one inside the other, and are each connected to a corresponding clutch 65 to receive the motion from the corresponding clutch 65. Each clutch 65 comprises drive discs which are integral with the cage 64 (and therefore always rotate together with the drive shaft 20 to which the cage 64 is constrained) and driven discs which are interleaved with the drive discs and are integral with the corresponding primary shafts 66 (and therefore always rotate together with the corresponding primary shafts 66).

The cage 64 of the gearbox 7 with double clutch 65 is arranged on the opposite side of the internal combustion engine 5 (namely of the drive shaft 20) relative to the two primary shafts 66; furthermore, the gearbox 7 with double clutch 65 comprises a transmission shaft 67 that connects the drive shaft 20 to the cage 64, is coaxial to the two primary shafts 66, and is inserted into the two primary shafts 66. In other words, the transmission shaft 67 terminates in the area of an end wall of the cage 64 and is constrained to the end wall of the cage 64. In particular, a first primary shaft 66 is arranged on the outside, the transmission shaft 67 is arranged inside, and the other (second) primary shaft 66 is arranged between the transmission shaft 67 and the first primary shaft 66. In other words, from the inside towards the outside are the transmission shaft 67 (which is in the centre) and in succession the two primary shafts 66 (which are inserted one inside the other, both surrounding the transmission shaft 67).

According to a preferred embodiment illustrated in the attached figures, the primary shafts 66 and the transmission shaft 67 of the gearbox 7 are coaxial to the drive shaft 20 of the internal combustion engine 5; namely the internal combustion engine 5 is aligned with the gearbox 7.

The gearbox 7 with double clutch 65 comprises a single secondary shaft 68 connected to the differential 8 which transmits the motion to the rear drive wheels 4; according to an alternative and equivalent embodiment, the gearbox 7 with double clutch comprises two secondary shafts 68 both connected to the differential 8. A pair of axle shafts 69 originate from the differential 8, each of which is integral with a rear drive wheel 4.

The gearbox 7 has seven forward gears indicated by Roman numerals (first gear I, second gear II, third gear III, fourth gear IV, fifth gear V, sixth gear VI and seventh gear VII) and a reverse gear (indicated by the letter R). Each primary shaft 66 and the secondary shaft 68 are mechanically coupled to one another by a plurality of gears, each of which defines a respective gear and comprises a primary toothed gear 70 mounted on the primary shaft 66 and a secondary toothed gear 71 mounted on the secondary shaft 68. To allow correct operation of the gearbox 7, all the odd gears (first gear I, third gear III, fifth gear V, seventh gear VII) are coupled to the same primary shaft 66, while all the even gears (second gear II, fourth gear IV, and sixth gear VI) are coupled to the other primary shaft 66.

Each primary toothed gear 70 is fitted to a respective primary shaft 66 so that it always rotates integrally with the primary shaft 66 and meshes permanently with the respective secondary toothed gear 71; each secondary toothed gear 71, on the other hand, is mounted idle on the secondary shaft 68. Furthermore, the gearbox 7 comprises four double synchronizers 72, each of which is mounted coaxial to the secondary shaft 68, is arranged between two secondary toothed gears 71, and is designed to be actuated to alternatively engage the two respective secondary toothed gears 71 with the secondary shaft 68 (namely, to alternatively make the two respective secondary toothed gears 71 angularly integral with the secondary shaft 68). In other words, each synchronizer 72 can be moved in one direction to engage a secondary toothed gear 71 with the secondary shaft 68, or can be moved in the other direction to engage the other secondary toothed gear 71 with the secondary shaft 68.

Figure 13:
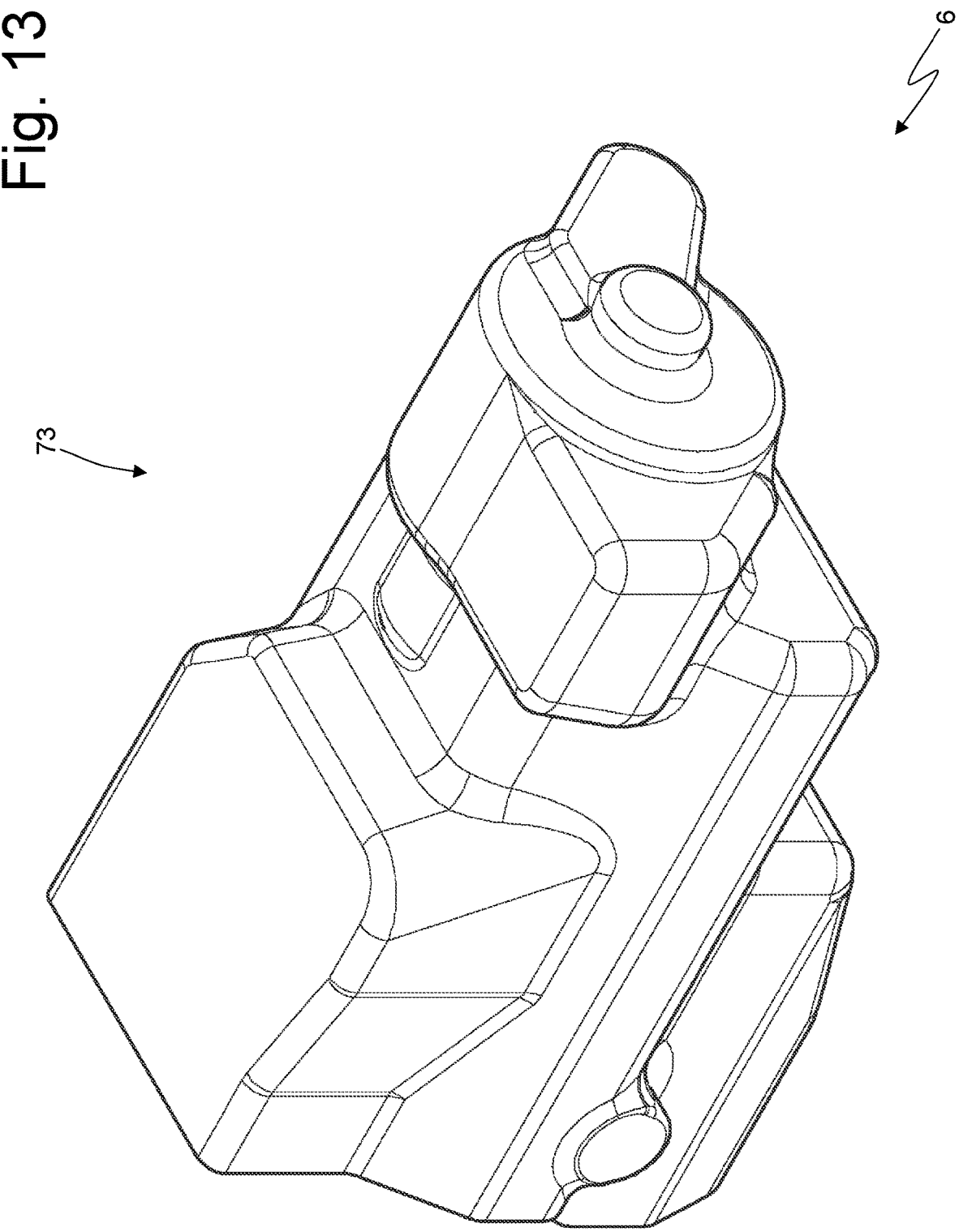
FIGS. 13 and 14 are a perspective view and a lateral view respectively of a transmission system of the car of FIG. 1.
Figure 14:
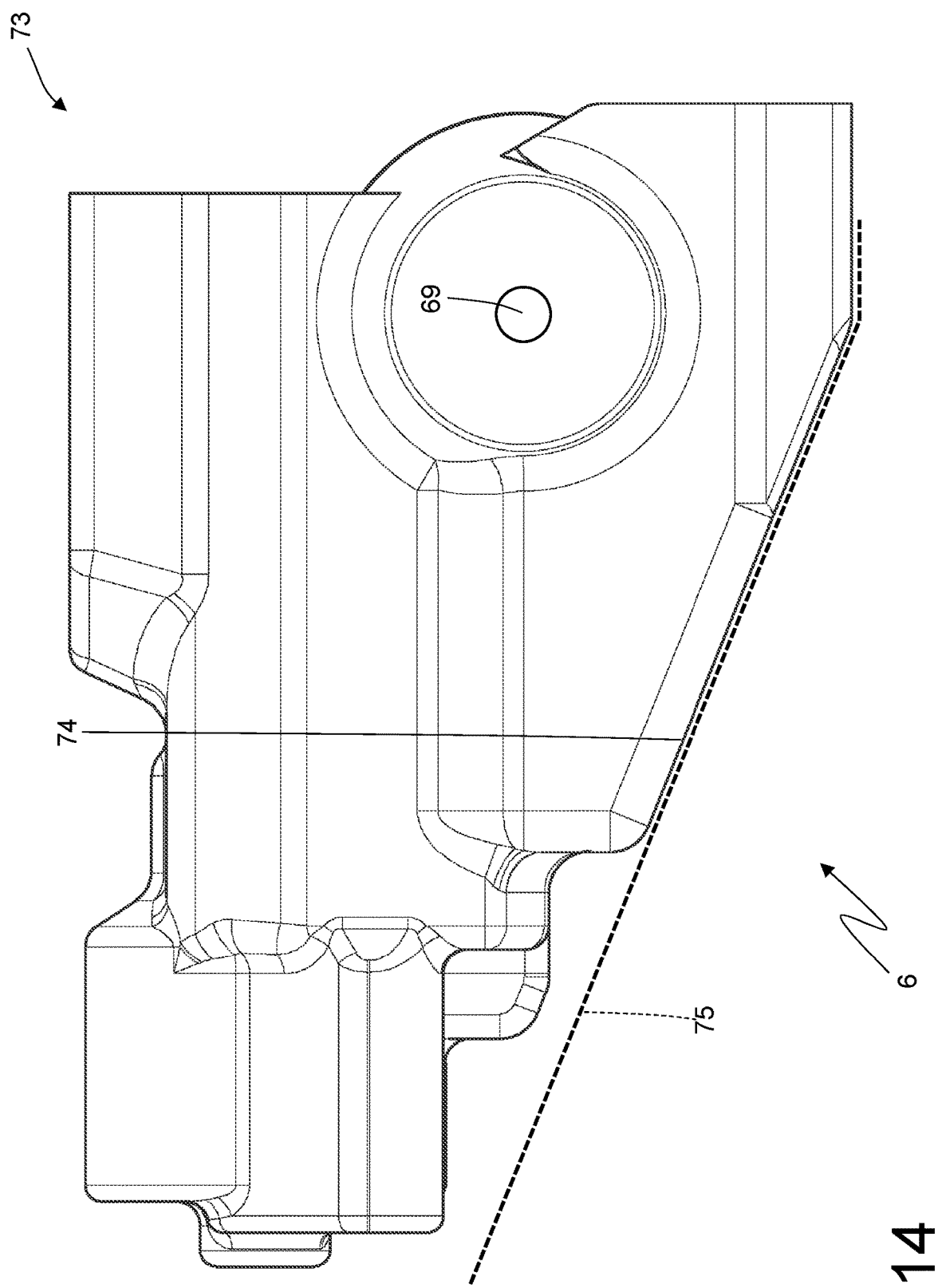

As illustrated in FIGS. 13 and 14, the car 1 comprises a containing body 73 that contains inside it (also) the gearbox 7 with double clutch and has a shape which tapers to the rear so that the height of the containing body 73 progressively decreases from the front to the rear. Namely, a front wall of the containing body 73 extends to a greater height than a rear wall of the containing body 73. In particular, the containing body 73 has in its lower part a bottom wall 74 which is inclined relative to the horizontal due to the tapered shape of the containing body 73.

The differential 8 (that receives the motion from the secondary shaft 68 of the gearbox 7 and transmits the motion to the two rear drive wheels 4 via the two respective axle shafts 69) is arranged inside the containing body 73 in a front position and below the gearbox 7. The two axle shafts 69 protrude laterally from the containing body 73.

From the above description, it can be summarised that the gearbox 7 is directly connected to the drive shaft 20 of the internal combustion engine 5, is aligned with the internal combustion engine 5 (namely the primary shafts 66 and the transmission shaft 67 of the gearbox 7 are coaxial to the drive shaft 20 of the internal combustion engine 5), and is arranged behind the internal combustion engine 5; furthermore, the intercooler 39 is arranged horizontally above the gearbox 7 (namely above the containing body 37 containing the gearbox 7).

Figure 7:
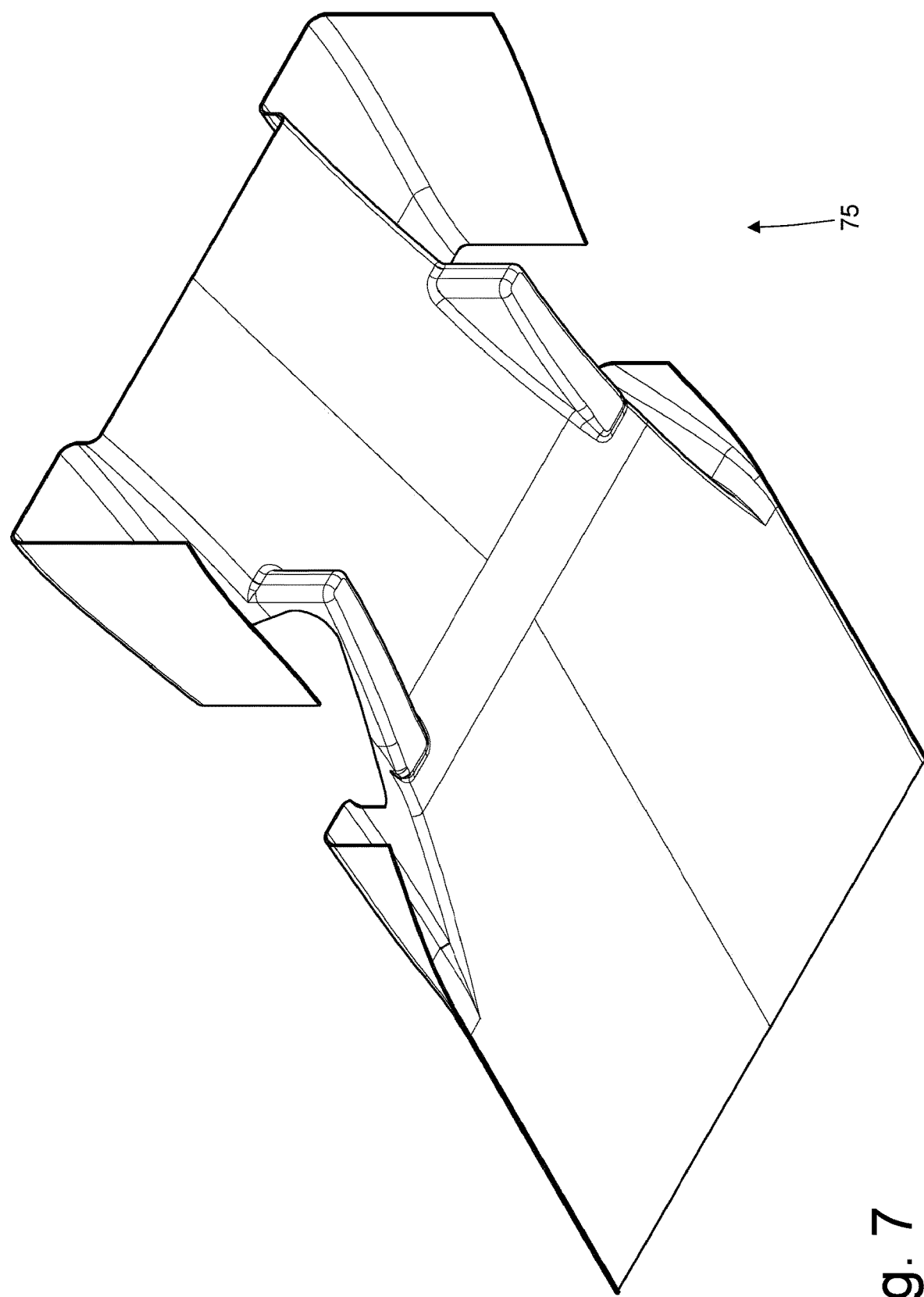
FIGS. 7 and 8 are a perspective view and a lateral view respectively of an aerodynamic diffuser of the car of FIG. 1.
Figure 8:
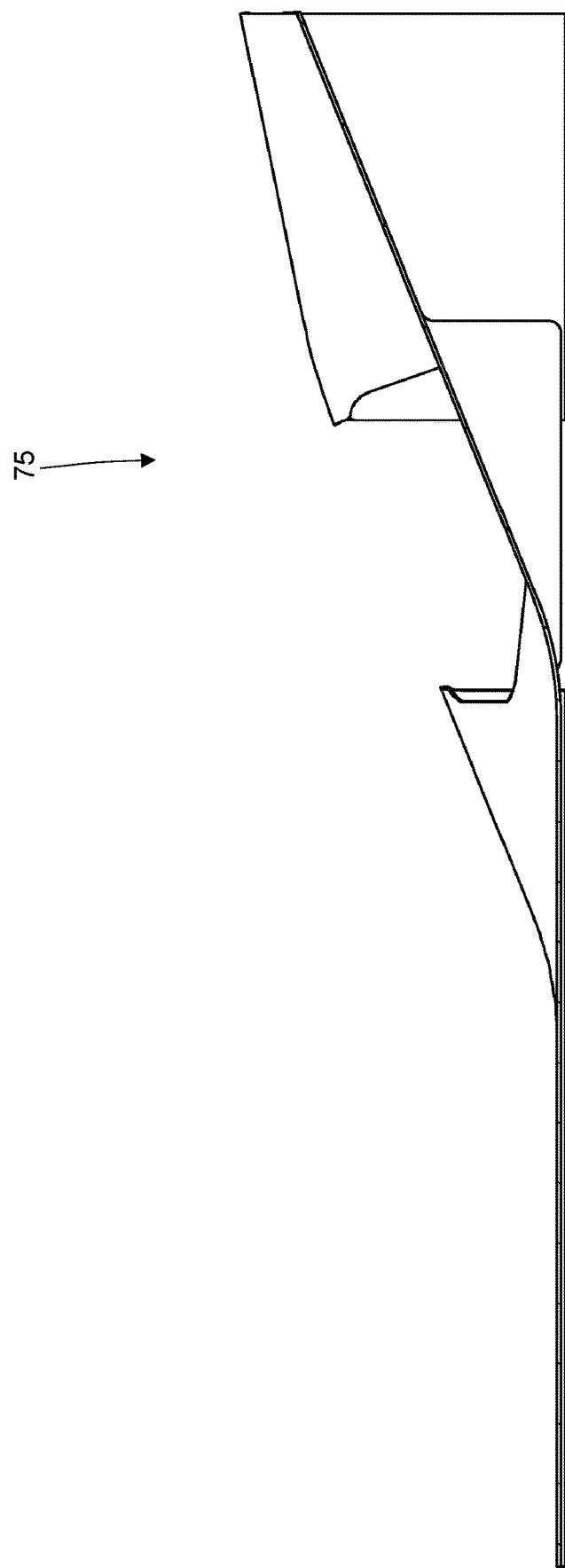
Figure 9:
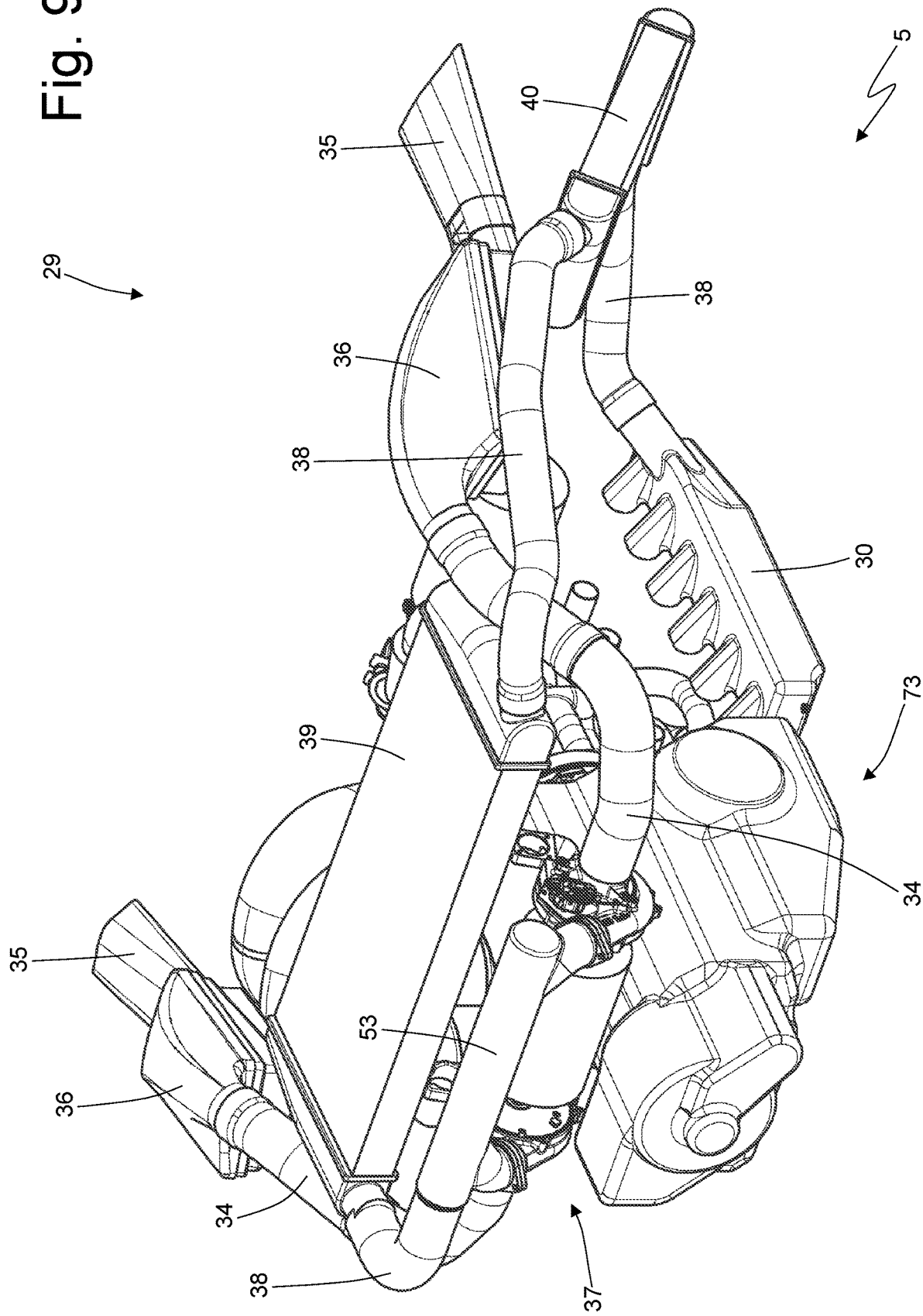
FIGS. 9-12 are two different perspective views respectively, an overhead view and a rear view of the internal combustion engine.
Figure 10:
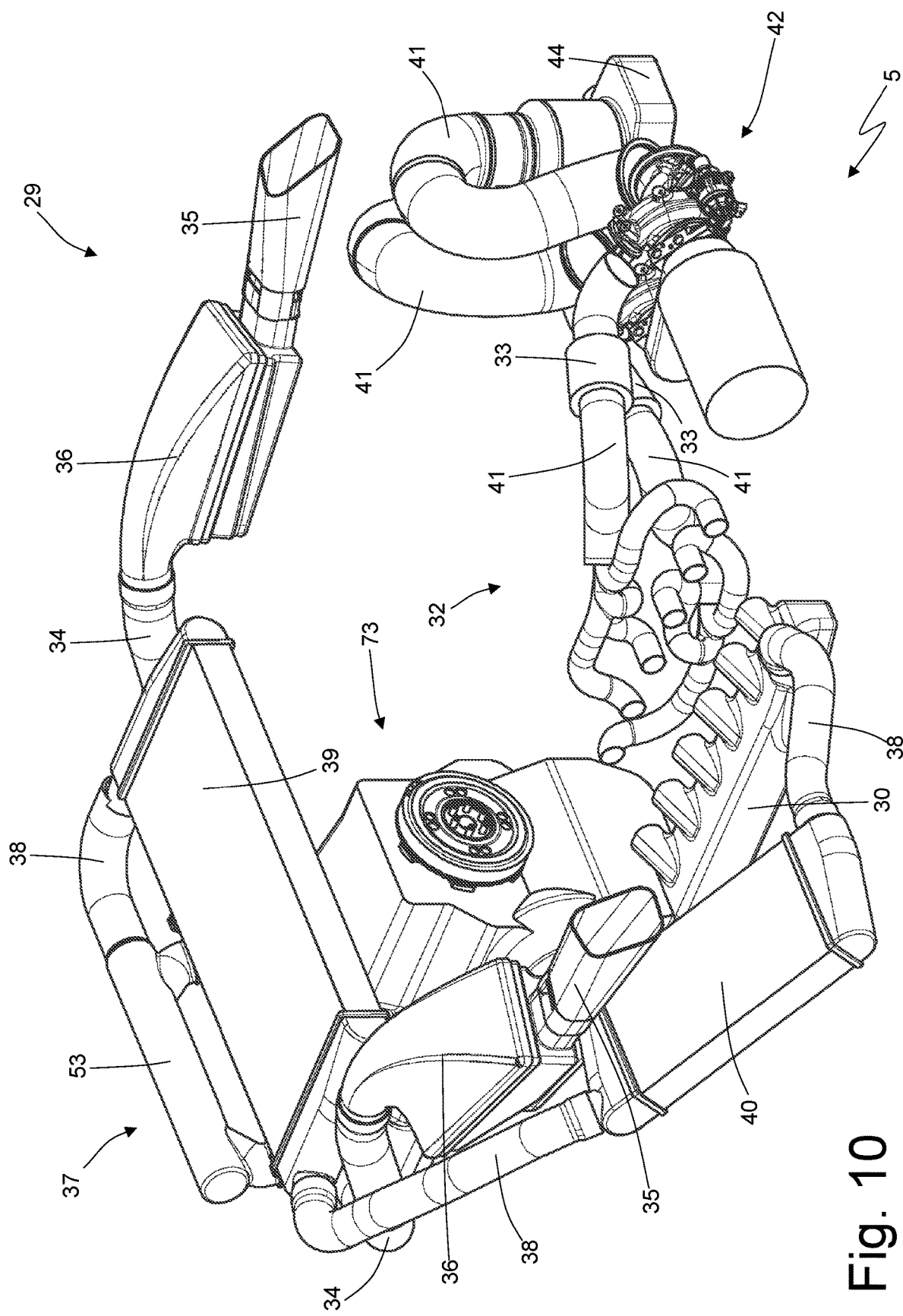

As illustrated in FIGS. 3, 7 and 8, the car 1 comprises a rear aerodynamic diffuser 75 which faces the road surface, begins in the area of a rear wall of the engine block (formed of the crankcase 17 and head 21) of the internal combustion engine 5 and is arranged below the gearbox 7 (namely below the containing body 73 containing the gearbox 7).

According to a preferred embodiment, the bottom wall 74 of the containing body 73 (inside which the gearbox 7 is located) has the same inclination as the rear aerodynamic diffuser 75; namely, the bottom wall 74 of the containing body 73 reproduces the shape of the rear aerodynamic diffuser 75, having the same inclination. In this way, the rear aerodynamic diffuser 75 exploits all the available space below the gearbox 7 (namely, below the containing body 73 containing the gearbox 7).

Figure 6:
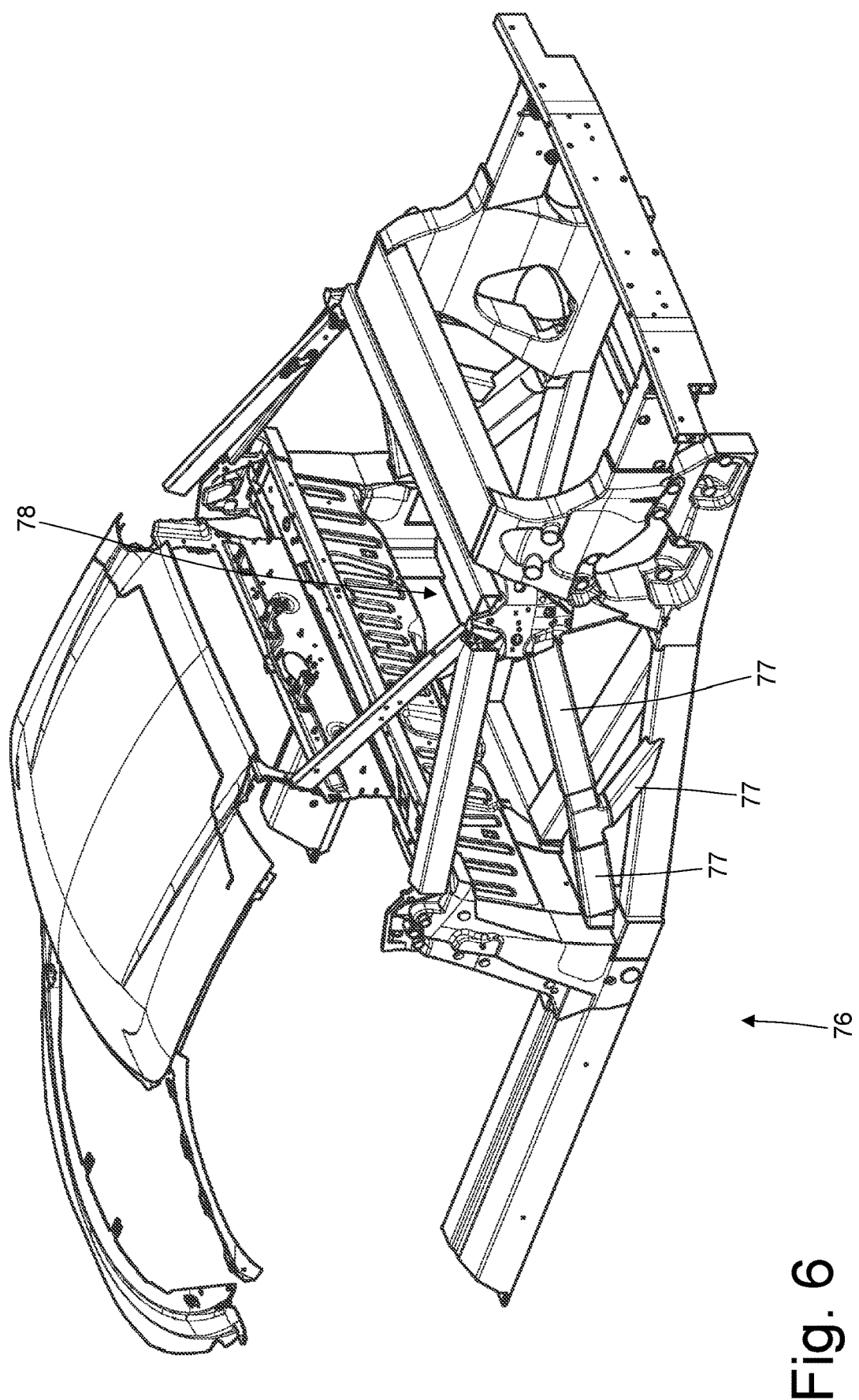
FIG. 6 is a perspective view with parts removed for clarity of a chassis of the car of FIG. 1.

As illustrated in FIG. 6, the car 1 comprises a chassis 76 (partially illustrated in FIG. 6). The rear part of the chassis 76 comprises lateral bars 77 which are arranged in the area of the spherical tanks 15 to protect the spherical tanks 15 from lateral impact; the lateral bars 77 are tetrahedral to provide greater impact resistance.

As illustrated in FIG. 6, inside the chassis 76 an engine compartment 78 is obtained in which the internal combustion engine 5 is arranged. As illustrated in FIG. 3, the bottom 14 of the car 1 comprises an opening 79 which is arranged in the area of the engine compartment 78 and a panel 80 that can be disassembled and which is removably fixed and closes the opening 79. The opening 79 has a dimension analogous to a dimension of the engine compartment 78; namely, the dimension of the opening 79 is approximately (as far as possible) equal to the dimension of the engine compartment 78 so that the opening 79 gives complete access to the engine compartment 78.

According to a preferred embodiment, the removable panel 80 is at least partially transparent; in particular the removable panel 80 has centrally a transparent window 81 (for example, made of glass). The function of the transparent window 81 is essentially technical, since it allows visual inspection of the internal combustion engine 5 without having to remove the removable panel 80.

According to a preferred embodiment, the bodywork 12 does not have any bonnet that can be opened (arranged above the engine compartment 78) giving access to the engine compartment 78; namely, access to the engine compartment 78 is only from below through the opening 79 since the upper part of the engine compartment 78 is permanently closed by fixed non-removable panels of the bodywork 12.

According to a preferred embodiment, the removable panel 80 is directly fixed to the chassis 76 by means of a plurality of screws 82 (preferably quarter turn screws 82).

The rear aerodynamic diffuser 75 faces the road surface, is arranged at the rear of the removable panel 80, and borders on the removable panel 80. Namely, the rear aerodynamic diffuser 75 begins where the removable panel 80 finishes. Also the aerodynamic diffuser 75 can be removed to allow simpler access to the containing body 73 of the gearbox 7.

The embodiment illustrated in FIGS. 9-12 comprises the turbine assembly 42 that generates electrical energy by means of the electric generator 54 and the compressor unit 37 that operates the two compressors 49 by means of the electric motor 50 that uses (at least partly) the electrical energy generated by the electric generator 54 of the turbine assembly 42.

In the embodiment illustrated in FIGS. 18-21, there is no turbine assembly 42 and the compressor unit 37 is without the electric motor 50 as the two compressors 49 are operated by the gearbox 7 taking the motion from the cage 64 of the clutches 65 of the gearbox 7 (as will be explained better below). In other words, the two compressors 49 are operated by the transmission shaft 67 of the gearbox 7 (which directly causes rotation of the cage 64 of the clutches 65 and is directly connected to the drive shaft 20). This embodiment is slightly less efficient in energy terms (as it does not recover part of the energy of the exhaust gases through the turbine assembly 42) but it is lighter, more compact and simpler, as it completely eliminates the electrical part (in fact, neither the electric generator 54 of the turbine assembly 42 nor the electric motor 50 of the compressor unit 37 are present).

As illustrated in FIGS. 22-26, an actuation system 83 is provided that connects the cage 64 of the gearbox 7 to the compressor unit 37 (namely to the two compressors 49 of the compressor unit 37) so as to take the motion from the cage 64 of the gearbox 7 to drive in rotation the two compressors 49 of the compressor unit 37. By way of example, the actuation system 83 increases the rotation speed so that the two compressors 49 of the compressor unit 37 always rotate faster than the cage 64 of the gearbox 7; for example the two compressors 49 of the compressor unit 37 could rotate 7-8 times faster than the cage 64 of the gearbox 7.

As illustrated in FIG. 15, the actuation system 83 is connected to an end wall of the cage 64 of the gearbox 7 on the opposite side of the transmission shaft 67; namely, the cage 64 of the gearbox 7 has an end wall which on one side is connected to the transmission shaft 67 and on the opposite side is connected to the actuation system 83.

Figure 24:
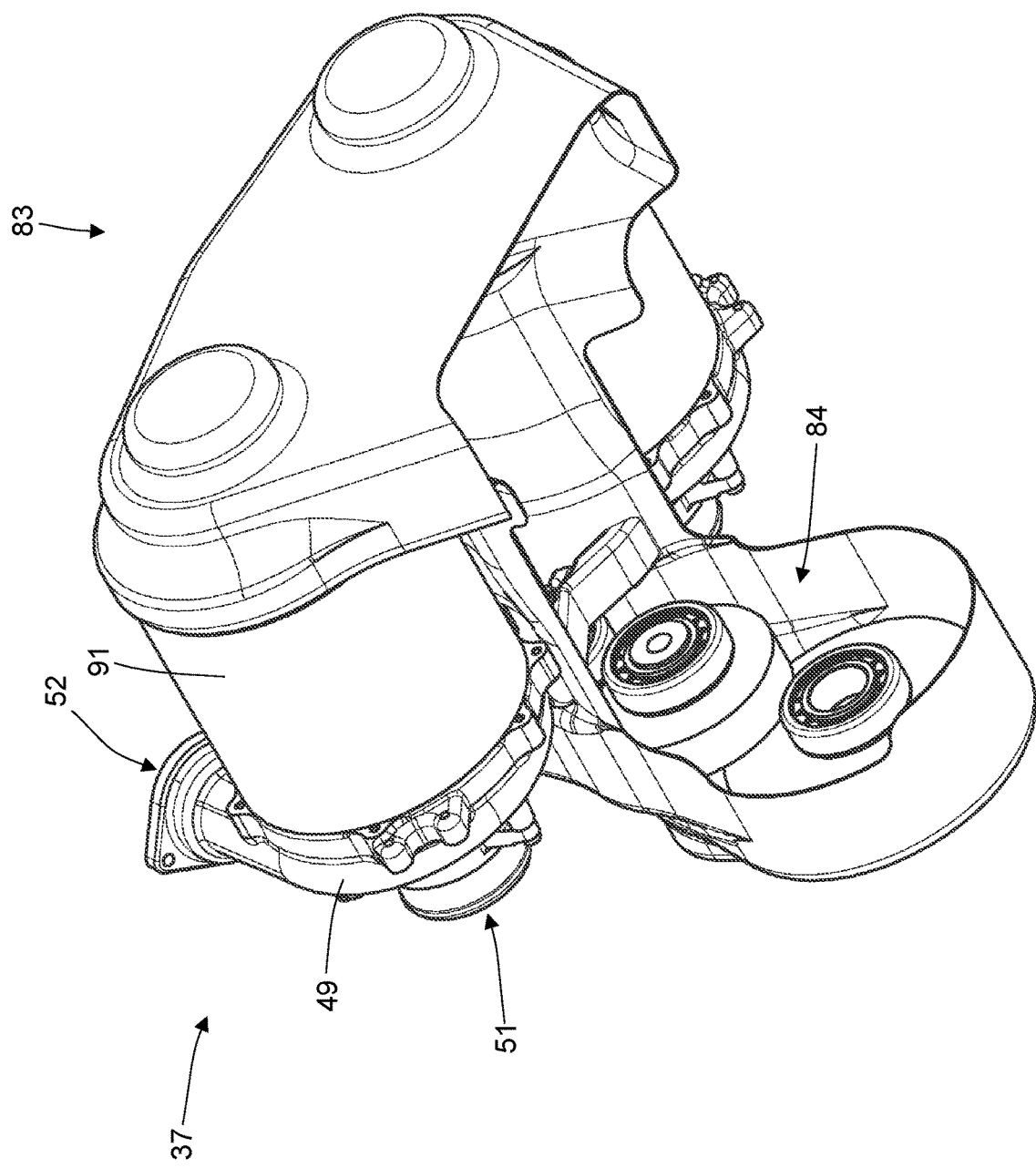
FIGS. 24 and 25 are two different perspective views of the compressor unit of FIGS. 22 and 23 and a corresponding actuation system.

According to a possible embodiment schematically illustrated in FIG. 24, the actuation system 83 comprises a variator device 84 which is interposed between the cage 64 of the gearbox 7 and the compressors 49 and has a variable transmission ratio. Preferably, the variator device 84 has a centrifugal activation so as to autonomously modify the transmission ratio according to the rotation speed of the cage 64 of the gearbox 7; in particular, the variator device 84 is configured to decrease the transmission ratio as the rotation speed of the cage 64 of the gearbox 7 increases. Namely, when the rotation speed of the cage 64 of the gearbox 7 is lower, the transmission ratio is greater and therefore (at the same rotation speed of the cage 64) the compressors 49 rotate faster, whereas when the rotation speed of the cage 64 of the gearbox 7 is higher, the transmission ratio is smaller and therefore (at the same rotation speed of the cage 64) the compressors 49 rotate more slowly; in this way, the compressors 49 are able to generate effective compression also when the cage 64 of the gearbox rotates slowly without "overspeeding" when the cage 64 of the gearbox rotates fast.

According to a preferred embodiment, the variator device 84 has only two different transmission ratios; by way of example, the two transmission ratios obtainable via the variator device 84 could differ from each other by 30-40%.

According to a preferred embodiment, the variator device 84 comprises a direct drive engaged by a centrifugal clutch and a planetary gear train that produces a lower transmission ratio from direct drive: the centrifugal clutch is operated by the centrifugal force that compresses the clutch discs engaging the direct drive when the rotation speed of the cage 64 of the gearbox 7 exceeds a threshold value (therefore they determine a reduction in the transmission ratio when the rotation speed of the cage 64 of the gearbox 7 exceeds the threshold value). According to a preferred embodiment, a transmission ratio of the variator device 84 could correspond to a direct drive (namely a transmission ratio of 1:1) while the other transmission ratio could be between 1:1.3 and 1:1.4.

According to a preferred embodiment, the variator device 84 is connected to the cage 64 of the gearbox 7 on the opposite side of the primary shafts 66 and the transmission shaft 67.

In the embodiment illustrated in FIGS. 22-26, the two compressors 49 are arranged parallel to and spaced from each other so as to rotate around two rotation axes 85 which are parallel to and spaced from each other and are parallel to a rotation axis 86 of the cage 64 of the gearbox 7 (which is coaxial to the primary shafts 66, to the transmission shaft 67, and to the drive shaft 20). In particular, the rotation axis 86 of the cage 64 of the gearbox 7 is arranged between the rotation axes 85 of the two compressors 49; namely, the two compressors 49 are arranged on the two opposite sides of the rotation axis 86 of the cage 64 of the gearbox 7.

Figure 26:
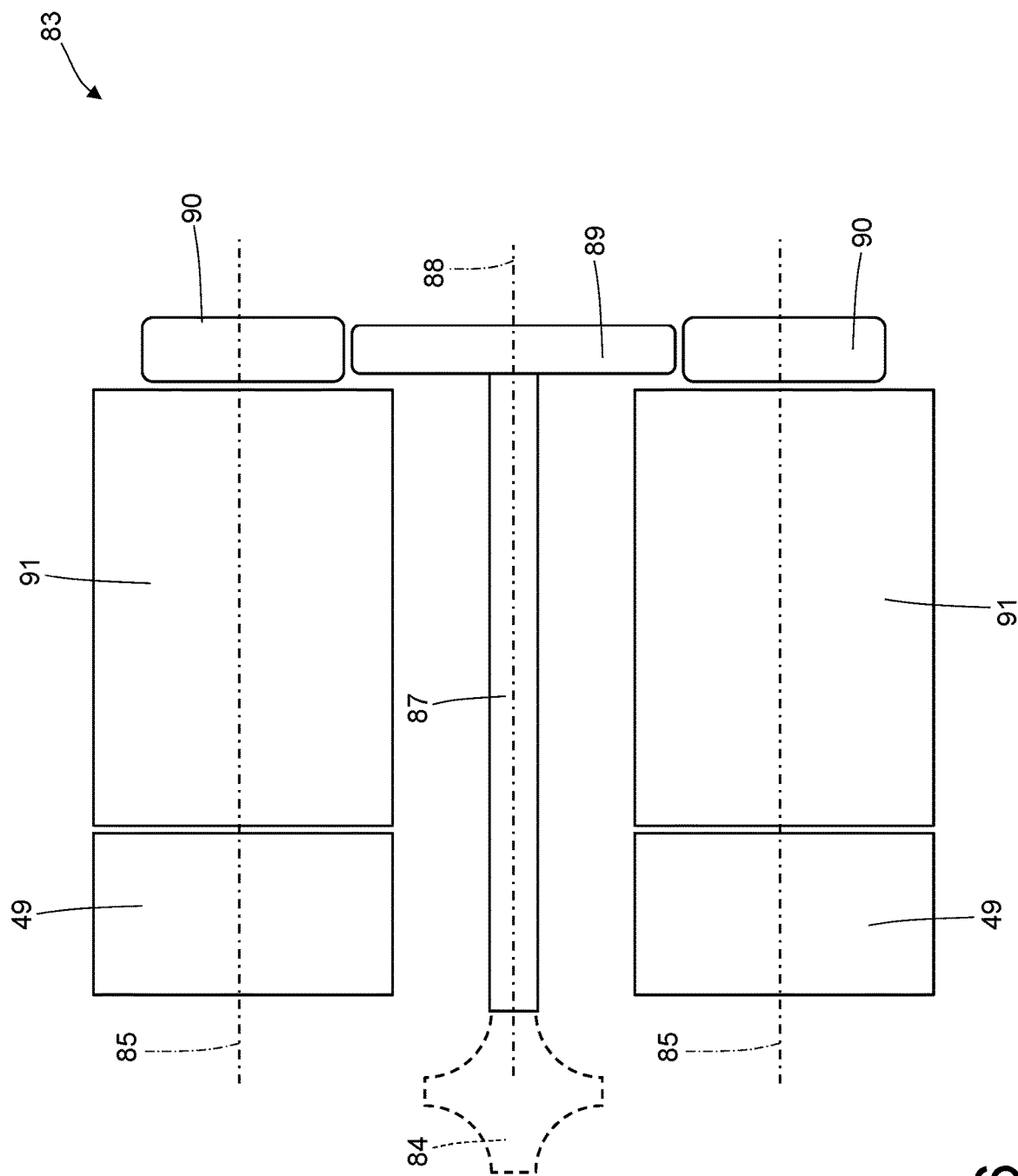
FIG. 26 is a schematic view of part of the actuation system of FIGS. 24 and 25.

According to a preferred embodiment illustrated in FIG. 26, the actuation system 83 comprises an intermediate shaft 87 that receives the motion from the cage 64 of the gearbox 7 and rotates around a rotation axis 88 which is parallel to and spaced from the rotation axis 86 of the cage 64 of the gearbox 7. In particular, between the cage 64 of the gearbox 7 and the intermediate shaft 87, the variator device 84 is interposed. The actuation system 83 comprises a central toothed gear 89 that receives the motion from the intermediate shaft 87 (namely, it is constrained to the intermediate shaft 87) and two lateral toothed gears 90 which are arranged on the two sides of the central toothed gear 89, mesh with the central toothed gear 89 and each transmit the motion towards a corresponding compressor 49 (namely, each lateral toothed gear 90 is constrained to a shaft of the corresponding compressor 49). Between each lateral toothed gear 90 and the corresponding compressor 49, a transmission 91 is interposed which increases the rotation speed, so that the compressor 49 can rotate faster than the lateral toothed gear 90.

Overall, the compressors 49 rotate much faster than the drive shaft 20 (namely than the cage 64 of the gearbox 7): the compressors 49 rotate approximately ten times faster than the drive shaft 20 (namely, the compressors 49 can reach 100,000 r.p.m. while the drive shaft 20 can reach 10,000 r.p.m.).

Figure 22:
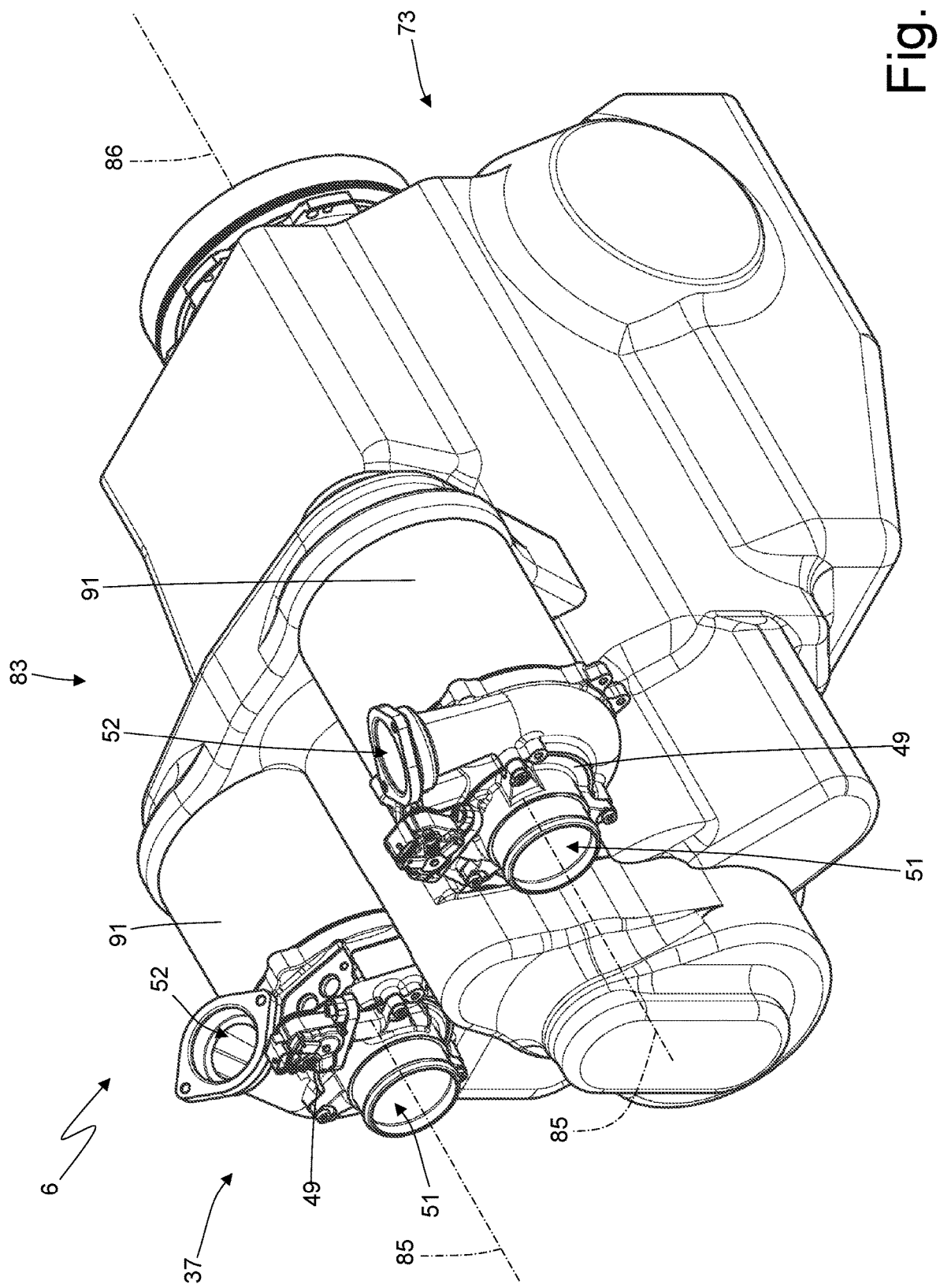
FIGS. 22 and 23 are a perspective view and a rear view respectively of a transmission system and a compressor unit coupled to the internal combustion engine of FIGS. 18-21.
Figure 23:
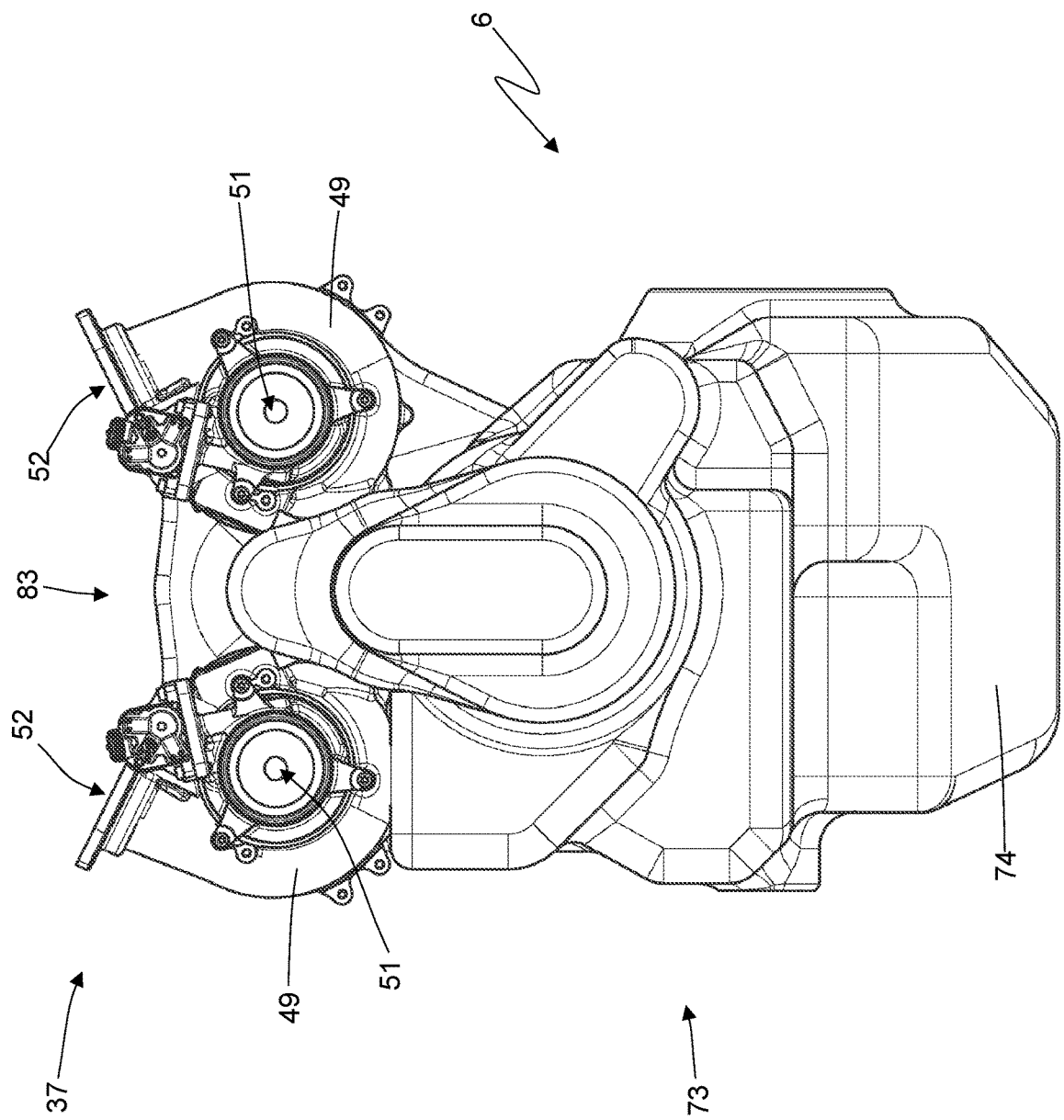
Figure 25:
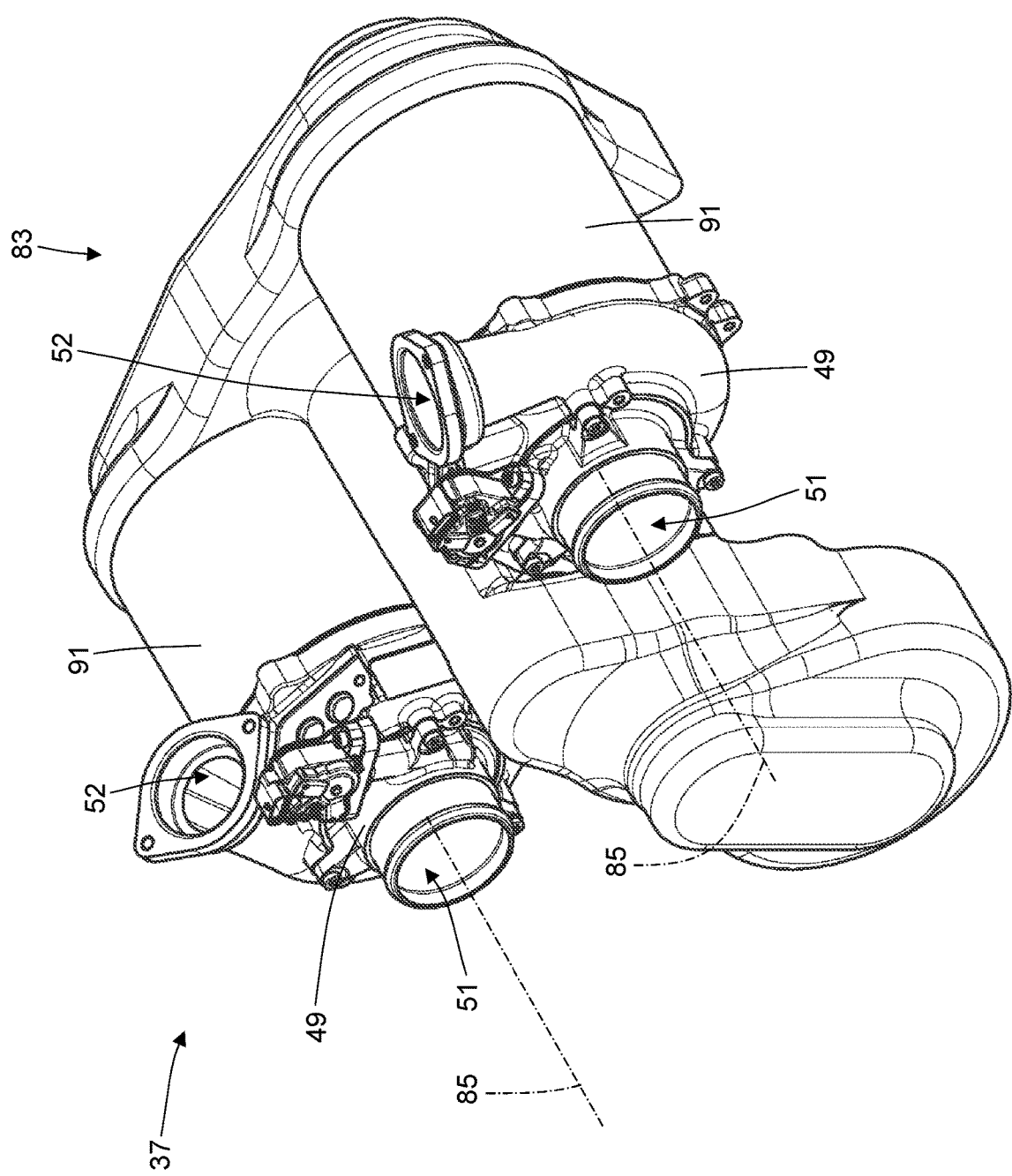

As illustrated in FIGS. 22 and 25, each compressor 49 comprises an axial inlet 51 arranged on the opposite side of the actuation system 83 and a radial outlet 52. As previously described, a connection duct 53 is provided (not illustrated in FIGS. 22-25) which is connected to both the outlets 52 of the two compressors 49 to receive and combine the compressed air from both the compressors 49.

In the embodiment illustrated in FIGS. 9-12, two exhaust ducts 41 are provided which originate from the cylinders 18 and terminate in the silencer 44 and are completely separate and independent of the cylinders 18 at the silencer 44. In the embodiment illustrated in FIGS. 18-21, on the other hand, one exhaust duct 92 is provided, into which both the exhaust ducts 41 merge, and terminates in the silencer 44; namely, the exhaust ducts 41 join together upstream of the silencer 44, both merging into the exhaust duct 92 which connects to the silencer 44. In other words, the exhaust system 32 comprises a single exhaust duct 92 that receives the exhaust gases from both the exhaust ducts 41; namely, the two exhaust ducts 41 join together to converge towards the one exhaust duct 92. The exhaust duct 92 begins at the confluence of the two exhaust ducts 41 and terminates in the silencer 44.

In the embodiment illustrated in the attached figures, the compressor unit 37 comprises two twin compressors 49; according to a different embodiment not illustrated, the compressor unit 37 comprises a single compressor 49.

In the embodiment illustrated in the attached figures, the turbine assembly 42 (when provided) comprises two twin turbines 43; according to a different embodiment not illustrated, the turbine assembly 42 (when provided) comprises a single turbine 43.

The embodiments described here can be combined without departing from the protective scope of the present invention.

The car 1 described above has numerous advantages.

Firstly, the car 1 described above combines a great hydrogen storage capacity (thus offering a satisfactory autonomy) with very high dynamic performance due to optimal wheelbase, overall weight, and weight distribution. These results are obtained due to the particular conformation and arrangement of the internal combustion engine 5 and of the transmission system 6 which allow for the creation of a large free space to house the hydrogen tanks 15 and 16 without affecting the dynamic performance of the car 1.

The car 1 described above allows for a rear aerodynamic diffuser having very large dimensions, thus allowing the generation of a very high aerodynamic load without in any way affecting the aerodynamic drag.

In the car 1 described above, inside the passenger compartment (particularly in the driving position 16 where the driver sits) it is possible to hear an exhaust noise that has both a sufficiently high intensity and an optimal sound quality; this result is obtained due to the fact that the outlet is very near the passenger compartment 15 and on the side of the driving position 16, since with this solution, the sound intensity is "concentrated" in the vicinity of the passenger compartment 15 and the exhaust noise is very natural (namely, not created or artificially modified). Namely, the exhaust noise is not artificially "blasted" towards the passenger compartment 15 through non-natural transmission channels; on the contrary, the exhaust noise reaches the passenger compartment 15 only by passing through the exhaust system, namely by following the natural outlet of the exhaust noise.

In the car 1 described above, also due to the particular conformation of the gearbox 7 with double clutch in which the cage 64 is arranged on the opposite side of the internal combustion engine, it is possible to obtain a particularly favourable positioning (namely, compact while at the same time being very functional) of all the propulsion system elements to minimize the length of the wheelbase (namely, the distance between the front axle and the rear axle).

In the car 1 described above, also due to the particular conformation of the compressor unit 37 in which the two twin compressors 49 are arranged coaxial to the opposite sides of the electric motor 50, it is possible to obtain a particularly favourable positioning (namely, compact while at the same time being very functional) of all the propulsion system elements; at the same time, the presence of two twin compressors 49 allows particularly high air flows to be compressed.

In the car 1 described above, also due to the particular conformation of the turbine assembly 42 in which the two twin turbines 42 are arranged side by side to drive the same common electric generator 54, it is possible to obtain a particularly favourable positioning (namely, compact while at the same time being very functional) of all the propulsion system elements; at the same time, the presence of two twin turbines 42 allows a large quantity of energy to be recovered from the exhaust gas.

In the car 1 described above (in particular in the embodiment illustrated in FIGS. 18-26), the geometry of the intake ducts 34 and 38 is optimal in terms of both overall dimensions and pressure losses without having to resort to electric actuation of the compressor unit 37; this result is obtained by taking the motion necessary for rotating the two compressors 49 of the compressor unit 37 directly from the cage 64 of the gearbox 7 with double clutch which is in a very favourable position for positioning of the compressor unit 37.

In the car 1 described above, the particular conformation and the particular positioning of the two intercoolers 39 and 40 allow the effectiveness and efficiency of the compressed air cooling to be maximised without excessively stringent constraints on the positioning of all the other components of the internal combustion engine 5.

In the car 1 described above, the aerodynamic diffuser 75 has a very large dimension (and therefore allows a high aerodynamic load to be generated with a modest increase in the aerodynamic drag) even if the internal combustion engine 5 is located in a central/rear position (therefore having optimal distribution of the masses between front axle and rear axle) and, at the same time, the wheelbase is relatively short (namely, the car 1 has an extremely high-performing dynamic behaviour). This result is obtained by positioning the internal combustion engine 5 with the drive shaft 20 arranged up: in this way also the gearbox 7 can be arranged higher up, consequently freeing in the lower part of the rear area of the car 1 the space necessary for housing the large aerodynamic diffuser 75.

In the car 1 described above, accessibility to all areas of the internal combustion engine 5 is optimal and complete; this result is obtained due to the accessibility from below which, once the car 1 has been raised, always allows an operator to position himself right below the component on which he is working. Namely, the accessibility from below to the internal combustion engine 5 facilitates and simplifies servicing, since the operators are not limited by the profile of the car 1 but can move easily in all the areas of the internal combustion engine 5 since the car 1 is raised.

In the car 1 described above, the fact that the removable panel is at least partially transparent represents, in addition to an undoubted technical advantage as previously explained, an aesthetic innovation and makes the removable panel also an aesthetic element; it is important to note that due to the large aerodynamic diffuser 75 it is relatively easy to see at least part of the internal combustion engine 5 through the transparent part of the removable panel without having to bend excessively.

In the car 1 described above, the bodywork 12 is particularly rigid and resistant due to the complete absence of an opening for access to the engine compartment 78 (normally closed by a bonnet). In this way, with the same rigidity, it is possible to reduce the overall mass of the bodywork 12. Furthermore, the absence of an opening for access to the engine compartment 78 also makes the bodywork 12 completely continuous (namely without interruptions), thus reducing the aerodynamic penetration coefficient. Elimination of an opening through the bodywork 12 for access to the engine compartment 78 is made possible by the fact that the internal combustion engine 5 does not require any maintenance in the upper part (formed of the crankcase 17) and consequently it is no longer necessary to access the engine compartment 78 from above. In fact, all the main components of the internal combustion engine 5 are in the lower part of the engine compartment 78 and are easily accessible from the bottom 14 through the opening 79 closed by the removable panel 80.

In the car 1 described above, the lubrication pumps 60 and 61 and the cooling pump 63 are optimally positioned and this allows minimization of the number of components required for rotation of the pumps 60, 61 and 63 and, at the same time, minimizes the pressure losses in the lubrication circuit 59 and in the cooling circuit 62. Namely, the unification and simultaneous operation of the four pumps 60, 61 and 63 by means of the two camshafts 23 and 26 makes the solution cheaper, lighter and more compact than the known solutions currently on the market.

LIST OF REFERENCE NUMBERS OF THE FIGURES 1 car
2 front wheels
3 electric machine
4 rear wheels
5 internal combustion engine
6 transmission system
7 gearbox
8 rear differential
9 passenger compartment
10 driving position
11 steering wheel
12 bodywork
13 doors
14 bottom
15 tank
16 tank
17 crankcase
18 cylinders
19 pistons
20 drive shaft
21 head
22 intake valves
23 camshaft
24 belt drive
25 exhaust valves
26 camshaft
27 fuel injector
28 spark plug
29 intake system
30 intake manifold
31 throttle valve
32 exhaust system
33 treatment device
34 intake ducts
35 air intakes
36 air filter
37 compressor unit
38 intake duct
39 intercooler
40 intercooler
41 exhaust ducts
42 turbine assembly
43 turbines
44 silencer
45 end pipe
46 outlet
47 shaft
48 rotation axis 49 compressor
50 electric motor
51 axial inlet
52 radial outlet
53 connection duct
54 electric generator
55 rotation axes
56 transmission device
57 radial inlet
58 axial outlet
59 lubrication circuit
60 lubrication pump
61 lubrication pump
62 cooling circuit
63 cooling pump
64 cage
65 clutches
66 primary shafts
67 transmission shaft
68 secondary shaft
69 axle shafts
70 primary toothed gear
71 secondary toothed gear
72 synchronizers
73 containing body
74 bottom wall
75 aerodynamic diffuser
76 chassis
77 lateral bars
78 engine compartment
79 opening
80 removable panel
81 transparent window
82 screws
83 actuation system
84 variator device
85 rotation axes
86 rotation axis
87 intermediate shaft
88 rotation axis
89 central toothed gear
90 lateral toothed gears
91 transmission
92 exhaust duct

The invention claimed is:

1. A turbine assembly (42) for an internal combustion engine (5) and comprising:
a first turbine (43), which rotates around a first rotation axis (55) and is configured to rotate due to a thrust exerted by exhaust gases emitted by the internal combustion engine (5);
a second turbine (43) which is independent and separate from the first turbine (43), rotates around a second rotation axis (55) and is configured to rotate due to the thrust exerted by exhaust gases emitted by the internal combustion engine (5);
an electric generator (54), which is operated by the first turbine (43) and by the second turbine (43); and
a transmission device (56), which connects the both turbines (43) to the same electric generator (54) and is configured to give the two turbines (43) the same rotation speed;
wherein the second rotation axis (55) of the second turbine (43) is parallel to and spaced from the first rotation axis (55) of the first turbine (43).

2. The turbine assembly (42) according to claim 1, wherein the transmission device (56) comprises:
two toothed gears, each integral to a shaft of the corresponding turbine (43) so as to receive the rotary motion from the turbine (43); and
a connection element, which connects the two toothed gears to one another so as to cause the both toothed gears to rotate together and at the same rotation speed.

3. The turbine assembly (42) according to claim 2, wherein the toothed gear of the transmission device (56) is directly constrained to a shaft of the electric generator (54) so that the electric generator (54) rotates at the same rotation speed as the two turbines (43).

4. The turbine assembly (42) according to claim 2, wherein the toothed gear of the transmission device (56) is connected to a shaft of the electric generator (54) through the interposition of a speed reducer so that the electric generator (54) rotates at a lower rotation speed than the rotation speed of the two turbines (43).

5. The turbine assembly (42) according to claim 2, wherein the connection element that connects the two toothed gears to each other is a timing belt, a chain, or a gear cascade.

6. The turbine assembly (42) according to claim 1, wherein the electric generator (54) is coaxial to the turbine (43).

7. The turbine assembly (42) according to claim 1, wherein the two turbines (43) are identical to one another.

8. The turbine assembly (42) according to claim 1, wherein the two turbines (43) are arranged side by side and the two respective rotation axes (55) are parallel to and spaced apart from one another.

9. The turbine assembly (42) according to claim 1, wherein the two turbines (43) are centrifugal turbines and each have a radial inlet (57) connected to a respective exhaust duct (41) and an axial outlet (52) arranged on the opposite side of the transmission device (56).

10. A car (1) comprising:
two front wheels (2);
two rear drive wheels (4);
an internal combustion engine (5), which is provided with a plurality of cylinders (18), where respective pistons (19) slide on the inside, and with a drive shaft (20) connected to the pistons (19); and
a turbine assembly (42), which is arranged along at least one exhaust duct (41) of the internal combustion engine (5) and is manufactured according to claim 1.

11. The car (1) according to claim 10, wherein the internal combustion engine (5) comprises two exhaust ducts (41), which originate from the cylinders (18), go through the turbines (43) of the turbine assembly (42) and end in a silencer (44), which is arranged on a side of the car (1).

12. The car (1) according to claim 10, wherein the internal combustion engine (5) is longitudinally arranged in a central or rear position and is vertically oriented with the drive shaft (20) arranged higher than the cylinders (18).

* * * * *